(12) United States Patent
Lim et al.

(10) Patent No.: US 8,554,241 B2
(45) Date of Patent: Oct. 8, 2013

(54) METHOD FOR AVOIDING INTER-CELL INTERFERENCE IN A MULTI-CELL ENVIRONMENT

(75) Inventors: Dong Guk Lim, Anyang-si (KR); Wook Bong Lee, Anyang-si (KR); Su Nam Kim, Anyang-si (KR); Bin Chul Ihm, Anyang-si (KR); Jae Wan Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 12/934,220

(22) PCT Filed: Mar. 30, 2009

(86) PCT No.: PCT/KR2009/001606
§ 371 (c)(1),
(2), (4) Date: Oct. 25, 2010

(87) PCT Pub. No.: WO2009/120048
PCT Pub. Date: Oct. 1, 2009

(65) Prior Publication Data
US 2011/0034192 A1   Feb. 10, 2011

Related U.S. Application Data

(60) Provisional application No. 61/040,157, filed on Mar. 28, 2008, provisional application No. 61/090,884, filed on Aug. 21, 2008.

(30) Foreign Application Priority Data

| Jun. 26, 2008 | (KR) | 10-2008-0060852 |
| Jul. 25, 2008 | (KR) | 10-2008-0072991 |
| Sep. 2, 2008  | (KR) | 10-2008-0086440 |
| Sep. 24, 2008 | (KR) | 10-2008-0093887 |

(51) Int. Cl.
H04W 72/00   (2009.01)
H04B 15/00   (2006.01)
H04J 11/00   (2006.01)

(52) U.S. Cl.
USPC ............... 455/452.2; 455/501; 370/203

(58) Field of Classification Search
USPC .......... 455/452.1, 452.2, 450, 464, 412.1, 455/414.1, 509, 513, 63.1, 67.11, 67.13; 370/282–292, 201, 230, 235, 250, 328, 370/329, 241.1, 331, 335, 337, 345
See application file for complete search history.

(56) References Cited

U.S. PATENT DOCUMENTS 7,689,177 B2 *   3/2010   Kim et al. ............. 455/101
7,907,552 B2 *   3/2011   Ashikhmin et al. ........ 370/280
(Continued)

FOREIGN PATENT DOCUMENTS

| JP | 2009-105893 A | 5/2009 |
| JP | 2009-112001 A | 5/2009 |

(Continued)

*Primary Examiner* — Andrew Wendell
*Assistant Examiner* — Cindy Trandai
(74) *Attorney, Agent, or Firm* — McKenna Long & Aldridge LLP

(57) ABSTRACT

A method for avoiding an inter-cell interference (ICI) in a multi-cell environment is disclosed. The method includes restricting the use of a PMI in an interfering cell so as to improve a reception performance of a mobile station located at an interfered cell edge. The mobile station measures a restricted-PMI of the interfering cell, which is prohibited from use in the interfering cell, and transmits the measured restricted PMI to the interfering cell. The use of the restricted PMI is prohibited from use in a mobile station in the interfering cell.

6 Claims, 11 Drawing Sheets

(56) References Cited

U.S. PATENT DOCUMENTS

| | | |
|---|---|---|
| 8,085,653 B2 * 12/2011 | Wong et al. | 370/208 |
| 8,179,775 B2 * 5/2012 | Chen et al. | 370/203 |
| 2006/0120477 A1 6/2006 | Shen et al. | |
| 2007/0092019 A1 4/2007 | Kotecha et al. | |
| 2007/0115909 A1 5/2007 | Wang et al. | |
| 2008/0009244 A1 * 1/2008 | Lee | 455/69 |
| 2008/0037669 A1 2/2008 | Pan et al. | |
| 2008/0153530 A1 * 6/2008 | Cho et al. | 455/513 |
| 2009/0015478 A1 * 1/2009 | Li et al. | 342/377 |
| 2009/0017769 A1 * 1/2009 | Chen et al. | 455/69 |
| 2009/0046569 A1 * 2/2009 | Chen et al. | 370/203 |
| 2009/0092059 A1 * 4/2009 | Fu | 370/252 |
| 2009/0181708 A1 * 7/2009 | Kim et al. | 455/501 |
| 2009/0196162 A1 * 8/2009 | Sambhwani et al. | 370/201 |
| 2009/0325590 A1 * 12/2009 | Liu et al. | 455/452.2 |

FOREIGN PATENT DOCUMENTS

| | | |
|---|---|---|
| JP | 2011-502380 | 1/2011 |
| JP | 2011-508576 | 3/2011 |
| JP | 2011-509017 | 3/2011 |
| JP | 2011-509040 | 3/2011 |
| JP | 2011-509571 | 3/2011 |
| JP | 2011-514690 | 5/2011 |
| JP | 2012-130027 | 7/2012 |
| KR | 10-20060119144 | 11/2006 |
| KR | 10-20070080394 | 8/2007 |
| KR | 10-20080084087 | 9/2008 |
| WO | WO 2007/106454 A1 | 9/2007 |
| WO | WO 2008/030035 A2 | 3/2008 |
| WO | WO 2009/052754 | 4/2009 |

* cited by examiner (a)

(b)

(a)

(b)

METHOD FOR AVOIDING INTER-CELL INTERFERENCE IN A MULTI-CELL ENVIRONMENT

This application claims the benefit of U.S. Provisional Application Nos. 61/040,157 filed on Mar. 28, 2008 and 61/090,884 filed on Aug. 21, 2008; Korean Patent Application Nos. 10-2008-0060852 filed on Jun. 26, 2008, 10-2008-0072991 filed on Jul. 25, 2008, 10-2008-0086440 filed on Sep. 2, 2008, 10-2008-0093887 filed on Sep. 24, 2008; and PCT Application No. PCT/KR2009/001606 filed on Mar. 30, 2009, all of which are incorporated by reference in their entirety herein.

TECHNICAL FIELD

The present invention relates to mobile communication, and more particularly to a method for avoiding an inter-cell interference (ICI) in a multi-cell environment.

BACKGROUND ART

Generally, the next-generation mobile communication and wireless communication systems increasingly require an improved data transfer rate and an improved system capacity in a multi-cell environment. Due to the above-mentioned demand, technologies of a multi-input multi-output (MIMO) system for transmitting data using a plurality of antennas have been intensively researched by many developers and companies. A closed-loop MIMO system, which uses channel information to increase a data transfer rate in a multi-cell environment, can improve a transmission throughput or performance using this channel information.

Generally, in the MIMO system, a terminal, a mobile station (MS), or a user equipment (UE) is able to recognize information of a reception (Rx) channel using received data, but a base station is unable to recognize this channel information. Therefore, in order to improve the system performance or throughput using the above channel information, the base station must recognize this channel information. In case of using a time division duplex (TDD) scheme, uplink/downlink (UL/DL) channels between the base station and the mobile station are equal to each other, such that the base station is able to recognize channel information.

In the closed-loop MIMO system, the base station transmits data using information of a transmission (Tx) channel of each mobile station. In this case, base stations are unable to recognize information of the transmission (Tx) channel of the serving mobile stations, such that they receive channel information (e.g., a channel quality indicator (CQI)) from each mobile station through a feedback path.

The mobile station estimates a channel receiving data using a signal received from the base station. The mobile station calculates a CQI using the estimated channel, such that it can apply a modulation coding scheme (MCS) appropriate for a channel status when the base station transmits data. In addition, the mobile station selects a channel coefficient (e.g., a precoding vector of a codebook), which is the most appropriate for a channel status, from a known codebook using the estimated channel and the codebook. Channel information, which has been calculated by the mobile station using the estimated channel, is transferred over a feedback channel between the base station and the mobile station. The base station transmits data to the mobile station using the channel information, the selected MCS, and the codebook's precoding vector which have been received from the mobile station.

Presently, many researches for the closed-loop MIMO system have been intensively conducted, and the closed-loop MIMO scheme is being applied to not only a single-cell environment but also a multi-cell environment. However, researched for reducing influences caused by interferences from other cells in multi-cell environment, by which usage of precoding matrixes in a codebook used in each cell is restricted, have been barely performed.

In the closed-loop MIMO system in a multi-cell environment, individual base stations allocate an optimum pre-codebook to each mobile station on the basis of a channel status between each base station and each mobile station, such that the base stations are able to provide each mobile station contained in a cell with a high-quality service.

However, because the strength of a signal transmitted from a base station of a cell is weak when a mobile station located at an edge of the cell receives the signal, the signal is affected by another signal which is processed with a optimum precoding matrix allocated to another mobile station in a neighboring cell and then transmitted from a neighboring base station located in the neighboring cell. Due to the inter-cell interference caused by the signal from the neighboring cell processed with the optimum precoding matrix, performance or throughput of a mobile station located at a cell edge is unavoidably decreased.

DISCLOSURE OF INVENTION

Technical Problem

Accordingly, the present invention is directed to a method for avoiding an inter-cell interference (ICI) in a multi-cell environment that substantially obviates one or more problems due to limitations and disadvantages of the related art.

An object of the present invention is to provide a method and/or apparatus for solving the problem that performance or throughput of a mobile station which is located at a cell edge is deteriorated by an inter-cell interference caused by a precoding matrix used in a neighboring cell.

Technical Solution

Some terms among all terms disclosed in the following specification and the attached claims will hereinafter be described. Referring to FIG. 1, a first user equipment $UE_1$ is located at an edge of cell A (Cell_A), and the first user equipment $UE_1$ receives services from cell A. The user equipment $UE_1$ is affected by cell B (Cell_B), cell C (Cell_C), and cell D (Cell_D), which are neighboring to cell A (Cell_A), as denoted by dotted lines. In other words, cell B (Cell_B), cell C (Cell_C), or cell D (Cell_D) may be defined as an interfering cell for causing interference to user equipment $UE_1$. On the contrary, cell A providing the user equipment $UE_1$ with services may be defined as a serving cell for user equipment $UE_1$.

In order to solve the above-mentioned problems, the present invention uses a closed-loop MIMO system using a precoding matrix index (PMI) restriction, in order to reduce inter-cell interference in multi-cell environment simultaneously while increasing a reception performance of a mobile station located at cell edge.

In order to perform PMI restriction of an interfering cell which may generate interference in a mobile station of a neighbor cell, the present invention provides a method for configuring a user equipment (UE) or mobile station (MS) for transmitting information of an interfering cell. In more detail, the present invention provides a method for establishing a threshold value to be applied to user equipments which are allowed to transmit information of an interfering cell using feedback information received from the user equipments, a method for transferring a predetermined threshold value from a base station to a mobile station, a method for using an arbitrary threshold value to select mobile stations which are allowed to transmit information of an interfering cell, a method for allowing a base station, when all mobile stations transmit information to the base station, to recognize a reception status of each mobile station and transmit a confirmation signal, and a method for allowing a base station to transmit signals to a mobile station satisfying a predetermined threshold value.

Besides, the present invention provides a method for measuring, at a mobile station contained in a cell, information of an interfering cell causing interference. In more detail, the present invention provides a method for measuring information of an interfering cell using handover message (e.g., base station ID(BS_ID), CELL_ID, RSSI), a method for measuring information of an interfering cell using channel information obtained by channel estimation, a Signal to Interference plus Noise Ratio (SINR), and a CQI and the like.

Further, the present invention provides a method for measuring at least one restricted PMI of the interfering cell, and a method for measuring, at a mobile station, an interfering cell generating the highest or strongest interference. Herein, 'restricted PMI' indicates the PMI which is being used in a neighboring cell and causes the strongest interference to a mobile station in a cell adjacent to the neighboring cell.

Further, the present invention provides a method for estimating, at a mobile station which is located at a cell edge, PMI information of at least one interfering cell to perform PMI restriction of the interfering cell. The PMI information, which is fed back to the interfering cell may contain one or more of channel quality information (CQI), interference power/level, and carrier to interference+noise ratio (CINR), which correspond to the restricted PMI as well as the restricted PMI.

Also, the present invention provides a method for reducing influences caused by an interfering cell using PMI restriction in connection with rank adaptation. In more detail, the present invention provides a method for allowing a mobile station located at a cell edge to measure a restricted PMI for each rank for an interfering cell such that it restricts the use of a PMI of the interfering cell using the measured PMI. In addition, the present invention provides a method for allowing a mobile station located at a cell edge to measure a restricted PMI corresponding to Rank 1 such that it restricts all precoding vectors including this restricted PMI, and a method for allowing a mobile station located at a cell edge to measure interfering-cell PMI information corresponding to Rank 1 such that only the mobile stations employing Rank 1 is restricted in PMI usage.

The present invention provides a method for constructing a table for PMI restriction of the interfering cell using PMI information of the interfering cell measured by a mobile station located at a cell edge, and then employing the constructed PMI table. In more detail, the present invention provides a method for performing the restriction using statistical values of the PMI information of the interfering cell, a method for transferring the constructed PMI table to an upper layer such that it uses this PMI table as downlink signaling information, and a method for indicating the constructed PMI table in a bitmap form.

The present invention provides a method for collecting PMI information regarding an interfering cell, which is fed back from a mobile station, in order to perform PMI restriction to the interfering cell, and a method for restricting the collected PMI information. In more detail, the present invention provides a method for establishing a feedback period during which information of the interfering cell is fed back from a mobile station, a specific period during which a base station receives information of the interfering cell from a mobile station, and a specific interval or range during which a base station restricts a PMI use, and provides a method for transferring the information of the interfering cell to a base station at different periods for individual mobile stations.

The present invention provides a method for restricting the use of a codebook of an interfering cell using the interfering-cell information measured by a mobile station. In more detail, the present invention provides a method for allowing specific mobile stations satisfying a threshold value to feed back interfering-cell information in order to perform PMI restriction of an interfering cell, a method for performing PMI restriction of an interfering cell using interfering-cell PMI information being fed back from a mobile station located at a cell edge, a method for restricting a PMI used by a mobile station located in an interfering cell using interfering-cell PMI information measured by another mobile station located at a cell edge, a method for allowing a base station in an interfering cell to transfer a threshold value, which is used for PMI restriction to mobile stations of the interfering cell, to the mobile stations of the interfering cell, a method for performing PMI restriction on only a mobile station having at least a specific status according to status information (e.g., SINR, throughput, CQI) of a mobile station contained in a cell, a method for establishing a threshold value for the PMI restriction using feedback information of a mobile station, and a method for performing the restriction on only a mobile station satisfying a threshold value received from a base station. The present invention provides a method for performing the restriction for each band or the whole band used by a mobile station when a PMI used by a mobile station of an interfering cell is restricted using PMI information of an interfering cell. Also, the present invention provides a method for employing a sub-optimal PMI for restriction when a PMI to be used by an interfering cell is restricted.

Furthermore, the present invention provides a method for feeding back information of an interfering cell to a base station. In more detail, the present invention provides a method for transferring information from a serving base station to an interfering base station over a backbone network, a method for allowing a mobile station to directly transfer information to the interfering base station over a feedback channel, and a method for employing a common feedback channel used for transmitting a restricted PMI to an interfering base station or employing an arbitrary channel for each base station.

Also, if channel information is used for a feedback message transferred for the PMI restriction, a restricted PMI, a base station identifier (BS_ID), a cell identifier (Cell_ID), and a band index (band_index) may be used. If a handover message is used as the feedback message for the PMI restriction, the restricted PMI and the band index may be used.

Further, in order to perform PMI restriction of an interfering cell, the present invention provides a method for measuring, at a mobile station located at a cell edge, restricted PMI information of the interfering cell, transferring the measured restricted PMI information to a base station including the mobile station, and forwarding, at the base station, the measured restricted PMI information to be restricted to the interfering cell over a backbone network so as to perform the PMI restriction. The restricted PIM information may include CQI, interference power/lever, and CINR, as well as a restricted PMI. The CQI, interference power/lever, and CINR may be delivered to an interfering cell along with the restricted PMI when occasion demands.

Also, in order to perform the PMI restriction of the interfering cell, the present invention provides a method for directly transferring, at a mobile station, PMI information of the interfering cell over a feedback channel established between the interfering cell and the mobile station located at a cell edge, thereby performing the PMI restriction.

Also, the present invention provides a method for transferring a table of a restricted PMI(s) to a mobile station, and employing, at the mobile station, the remaining PMI information except for the PMI(s) restricted by the transferred table. In this case, the above-mentioned table may be represented in bitmap form. At this time, the base station may not allocate the restricted PMI to the mobile station using restricted PMI information received from the interfered cell or neighbor cell. If a PMI fed back from a mobile station is equal to the restricted PMI received from a base station, the base station may transmit a signal for commanding the mobile station to use another PMI, and then another PMI may also be transferred to the base station. The base station in an interfering cell may transfer restricted PMI information received from an interfered cell to the mobile station, such that the mobile station may use another PMI except for the restricted PMI.

Further, the present invention may use a fractional frequency reuse (FFR) for reducing an inter-cell interference (ICI) and a cooperative MIMO in connection with the suggested PMI restriction methods, such that it can greatly decrease the influence of such ICI.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for avoiding an inter-cell interference (ICI) in a network of a wireless communication system employing a codebook, the method includes: receiving information, which is used to restrict a use of some parts of the codebook in an interfering cell, from a neighbor cell; and deciding at least one restriction element associated with the codebook using the received information, wherein the use of the restriction element is restricted in the interfering cell.

The information received from the neighbor cell may be used for a predetermined time period or several predetermined time periods.

The information received from the neighbor cell may be received over a backbone network for interconnecting the neighbor cell and the interfering cell, or may be received over a feedback channel established between a mobile station belonging to the neighbor cell and a network of the interfering cell.

The method may further include: establishing a threshold value which is used to decide a specific mobile station among mobile stations contained in the interfering cell, wherein a use of the decided restriction element is restricted in the specific mobile station; and transferring information associated with the decided restriction element and the established threshold value to the mobile station contained in the interfering cell.

Information of the restriction element associated with the codebook may be a precoding matrix belonging to the codebook.

Information of the codebook-associated restriction element may be an index of a precoding matrix belonging to the codebook.

In the above methods, the restriction element associated with the codebook may be a precoding matrix belonging to the codebook.

The information received from the neighbor cell may be an index of a precoding matrix belonging to the codebook, and the codebook-associated restriction element may be equal to an element corresponding to an index received from the neighbor cell among elements of the codebook, or may be decided by statistics of an element corresponding to an index received from the neighbor cell among elements of the codebook.

The information received from the neighbor cell may be channel state information (CSI), and the deciding of the codebook-associated restriction element may include deciding a precoding matrix corresponding to the received CSI among precoding matrixes contained in the codebook, wherein the codebook associated restriction element may be equal to the decided precoding matrix, or may be decided by statistics of the decided precoding matrix.

The element of the codebook may be formed by a product of an element of a base codebook and an element of a concatenation codebook, and the restriction element associated with the codebook may be a precoding matrix belonging to the base codebook.

The information received from the neighbor cell may be an index of a precoding matrix belonging to the base codebook, and the codebook-associated restriction element may be equal to an element corresponding to an index received from the neighbor cell among elements of the base codebook, or may be decided by statistics of an element corresponding to an index received from the neighbor cell among elements of the base codebook.

In another aspect of the present invention, there is provided a method for avoiding an inter-cell interference (ICI) in a network of a wireless communication system employing a codebook, the method includes: receiving information, which uses only some parts of the codebook in an interfering cell, from a neighbor cell; and deciding at least one request element associated with the codebook using the received information, wherein the use of the request element is requested in the interfering cell.

The method may further include: establishing a threshold value which is used to decide a specific mobile station among mobile stations contained in the interfering cell, wherein a use of the decided request element is requested in the specific mobile station; and transferring information associated with the decided request element and the established threshold value to the mobile station contained in the interfering cell.

The request element associated with the codebook may be a precoding matrix belonging to the codebook.

The element of the codebook may be formed by a product of an element of a base codebook and an element of a concatenation codebook, and the request element associated with the codebook may be a precoding matrix belonging to the base codebook.

In another aspect of the present invention, there is provided a method for avoiding an inter-cell interference (ICI) in a network of a wireless communication system employing a codebook, the method includes: establishing a threshold value for deciding whether to transmit at least one restriction element associated with the codebook or at least one request element associated with the codebook by a mobile station belonging to the serving cell, wherein a use of the at least one restriction element is restricted in an interfering cell and a use of the at least one request element is requested in the interfering cell; and transferring information associated with the established threshold value to the mobile station.

The codebook-associated restriction element or the codebook-associated request element may be a precoding matrix belonging to the codebook.

The element of the codebook may be formed by a product of an element of a base codebook and an element of a concatenation codebook, and the codebook-associated restriction element or the codebook-associated request element may be a precoding matrix contained in the base codebook.

The method may further include: upon receiving channel state information (CSI) of the interfering cell from the mobile station, generating the codebook-associated restriction element or the codebook-associated request element on the basis of the received CSI, and transmitting the generated elements to a base station of the interfering cell; or receiving the codebook-associated restriction element or the codebook-associated request element from the mobile station, and transferring the received elements to the base station of the interfering cell.

The method may further include: receiving not only a request for allowing transmission of the codebook-associated restriction element or the codebook-associated request element but also channel information of the mobile station from the mobile station; and transferring an acceptance message in response to the request to the mobile station, if a comparison result between a measurement value of the received channel information and the threshold value satisfies a predetermined relationship.

The threshold value may include at least one of CQI, SINR, CSI, interference power, interference vector, and geometry information, and is established on the basis of feedback information from the mobile station contained in the serving cell.

In another aspect of the present invention, there is provided a method for avoiding an inter-cell interference (ICI) in a network of a wireless communication system employing a codebook, the method includes: measuring, in association with at least one interfering cell, at least one restriction element associated with the codebook, at least one request element associated with the codebook, or channel state information (CSI) of the interfering cell, wherein a use of the at least one restriction element is restricted in the interfering cell and a use of the at least one request element is requested in the interfering cell; and transferring the measured restriction element, the measured request element, or the measured CSI of the interfering cell to a network of a serving cell or a network of the interfering cell.

The codebook-associated restriction element or the codebook-associated request element may be a precoding matrix belonging to the codebook.

The element of the codebook may be formed by a product of an element of a base codebook and an element of a concatenation codebook, and the codebook-associated restriction element or the codebook-associated request element may be a precoding matrix contained in the base codebook.

The transferring step may include: transferring the measured CSI of the interfering cell to a base station of the serving cell or a base station of the interfering cell through an analog feedback.

The measuring step may be performed in each frame, or is performed every predetermined frame period.

The codebook-associated restriction element or the codebook-associated request element may be measured using channel information related to the interfering cell or handover-associated information.

The codebook-associated restriction element or the codebook-associated request element may be measured in connection with at least one of a rank and the number of transmission streams.

In another aspect of the present invention, there is provided a method for avoiding an inter-cell interference (ICI) in a network of a wireless communication system employing a codebook, the method includes: receiving a broadcast signal, which includes information of at least one restriction element associated with the codebook and information of a threshold value for deciding whether to restrict a use of the codebook-associated restriction element, from a network of an interfering cell, wherein a use of the at least one restriction element is restricted in the interfering cell; and deciding an optimum precoding matrix index (PMI) on the basis of the codebook-associated restriction element, if a comparison result between a measurement value of channel information and the threshold value satisfies a predetermined relationship.

The codebook-associated restriction element may be a precoding matrix belonging to the codebook, and the optimum PMI may be decided on the basis of the codebook other than the received restriction element.

The element of the codebook may be formed by a product of an element of a base codebook and an element of a concatenation codebook, the restriction element associated with the codebook may be a precoding matrix belonging to the base codebook, and the optimum PMI may be decided on the basis of the base codebook except for the received restriction element.

In another aspect of the present invention, there is provided a method for avoiding an inter-cell interference (ICI) in a network of a wireless communication system employing a codebook, the method includes: receiving a broadcast signal, which includes information of at least one request element associated with the codebook and information of a threshold value for deciding whether to use the codebook-associated request element, from a network of an interfering cell, wherein a use of the at least one request element is requested in the interfering cell; and deciding an optimum precoding matrix index (PMI) on the basis of the codebook-associated request element, if a comparison result between a measurement value of channel information and the threshold value satisfies a predetermined relationship.

The codebook-associated request element may be a precoding matrix belonging to the codebook, and the optimum PMI is decided on the basis of the received request element and the concatenation codebook.

The element of the codebook may be formed by a product of an element of a base codebook and an element of a concatenation codebook, the restriction element associated with the codebook may be a precoding matrix belonging to the base codebook, and the optimum PMI may be decided on the basis of the received request element and the concatenation codebook.

It is to be understood that both the foregoing general description and the following detailed description of the present invention are exemplary and explanatory and are intended to provide further explanation of the invention as claimed.

Advantageous Effects

According to the present invention, inter-cell-interference can be effectively avoided.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In case of using a precoding or beamforming technology and the like, a used precoding matrix, a used precoding vector, or a beamformer may cause strong affects to a neighbor cell. This operation is called a 'flashlight effect'. According to embodiments of the present invention, in order to reduce the flashlight effect when a precoding or beamforming technology is used using a codebook, the embodiments may ask a neighbor base station not to use a specific codebook element of a codebook (e.g., a precoding matrix or a precoding vector). On the contrary, the embodiments may ask the neighbor base station to use a specific codebook element.

<Use Restriction or Use Request of either Codebook Vector or Codebook Matrix>

A closed-loop MIMO system improves a transmission throughput using channel information. A reception signal for performing the precoding using the channel information can be represented by the following equation 1:

$$Y = HW_i X + n \qquad \text{[Equation 1]}$$

In Equation 1, H is a channel, and n is a zero-mean Gaussian noise. $W_i$ is a vector contained in an optimum codebook pre-found by a base station prior to the beginning of data transmission. There are a variety of codebook vectors of a codebook (W) according to the number of transmission/reception (Tx/Rx) antennas and the number of transmission (Tx) streams. This codebook (W) may include individual codebooks as shown in the following equation 2.

$$W = [W_1 W_2 W_1 \ldots W_N] W_i : i = 1, 2, \ldots, N \qquad \text{[Equation 2]}$$

In Equation 2, $W_i$ is an i-th precoding vector contained in the codebook.

A mobile station selects a codebook vector having the most optimum throughput from a codebook using a reception (Rx) signal, and transmits the selected codebook vector to the base station over a feedback channel. By this precoding, a power and rate control of a transmission stream can be carried out, and co-channel interference can be removed.

Figure 1:
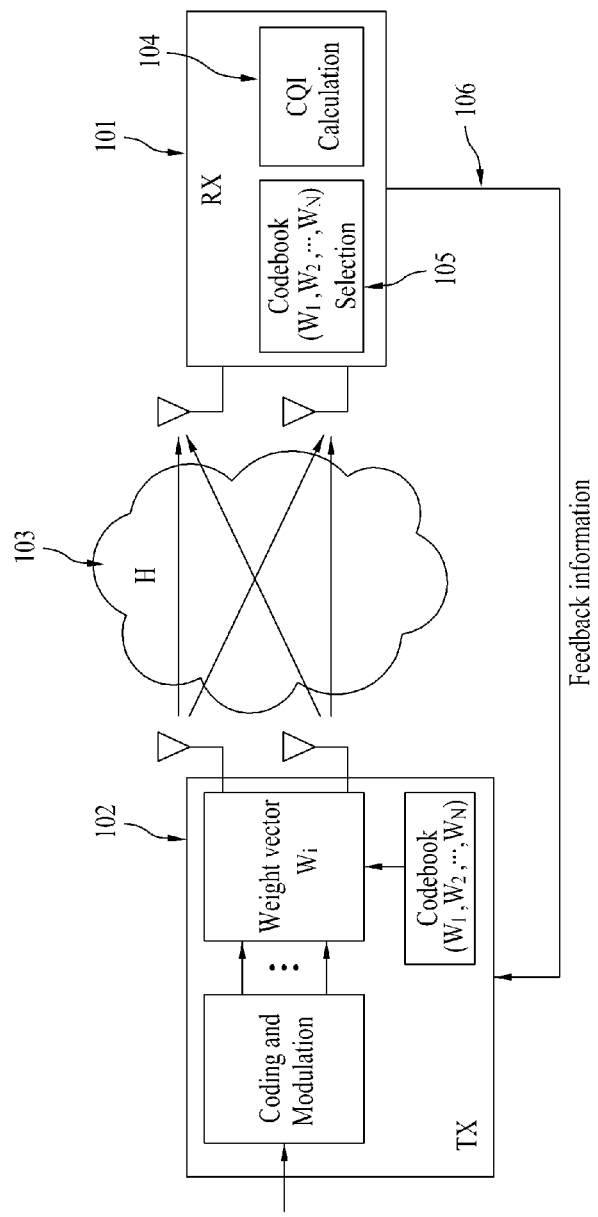
FIG. 1 is a block diagram illustrating a closed-loop MIMO system.

FIG. 1 is a block diagram illustrating a closed-loop MIMO system.

Referring to FIG. 1, a mobile station 101 estimates a channel 103 receiving data using a signal received from a base station 102. Based on the estimated channel, the mobile station 101 calculates a CQI at step 104, such that a modulation coding scheme (MCS) appropriate for a channel status can be applied to a data transmission process of the base station 102. The mobile station selects a channel coefficient (i.e., a precoding vector of a codebook) which is the most appropriate for the channel status, from a known codebook using the estimated channel and codebook at step 105. Channel information, which has been calculated by the mobile station 101 using the estimated channel, is transferred over a feedback channel 106 established between the base station 102 and the mobile station 101. In this case, the channel information may be transferred to the base station 102 by 'analog feedback'. The term 'analog feedback' means that the estimated channel information itself is fed back, not a fabricated form of the estimated channel information, such as quantized form by restricting the information to several quantized values and the transmitting the quantized value with an index indicating that.

The base station 102 transmits data to the mobile station using the channel information received from the mobile station 101, the selected MCS, and the precoding vector of the codebook.

The closed-loop MIMO system in a multi-cell environment is greatly interfered by neighboring cells. Specifically, the strength of a reception signal of a mobile station (i.e., a first mobile station) located at an edge or boundary of a cell is weaker than that of another mobile station (i.e., a second mobile station) located in the cell, such that the mobile station located at the cell edge is greatly influenced by a neighbor cell.

Figure 2:
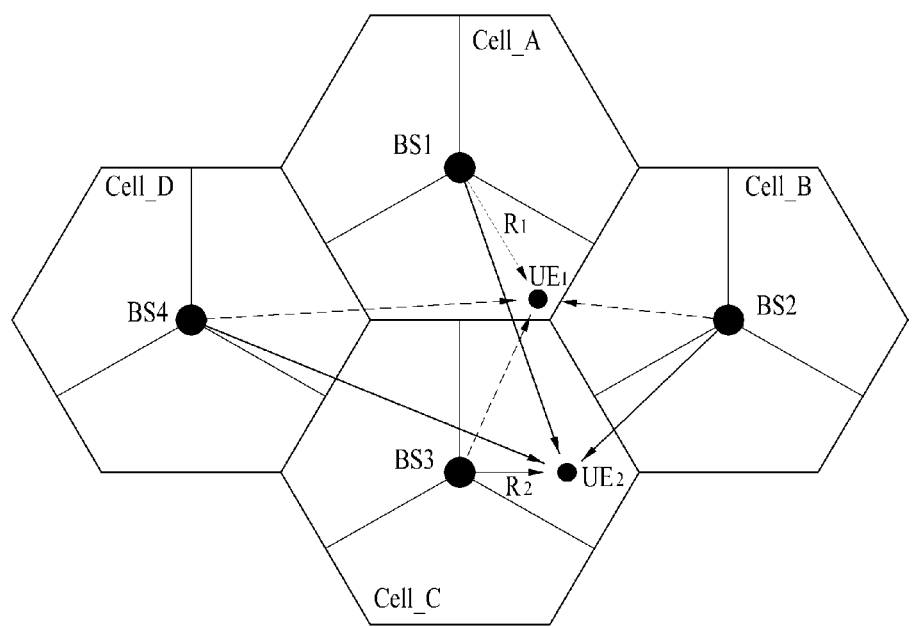
FIG. 2 is a conceptual diagram illustrating an inter-cell interference in a multi-cell environment.

FIG. 2 is a conceptual diagram illustrating an inter-cell interference in a multi-cell environment.

Referring to FIG. 2, a user equipment $UE_1$ located at an edge of a cell A (Cell_A) is very far from a serving base station BS1 providing services to cell A (Cell_A), such that a reception signal $R_1$ has a very weak strength. The user equipment ($UE_1$) is located at a boundary among neighbor cells (e.g., Cell_B, Cell_C, and Cell_D), such that it is interfered from the neighbor cells (e.g., Cell_B, Cell_C, and Cell_D), resulting in a very low reception performance or throughput. A user equipment $UE_2$ located in the C cell (Cell_C) is adjacent to a base station BS3, such that its reception signal $R_2$ has a very good strength. Also, although the user equipment $UE_2$ is affected by the interference from the neighbor cells (e.g., Cell_A, Cell_B, Cell_D), the strengths of signals received from the neighbor cells (e.g., Cell_A, Cell_B, Cell_D) are weak, such that they scarcely affect a reception throughput. Therefore, a user equipment (e.g., $UE_1$) located at a cell edge is affected by a neighbor cell much more than another user equipment (e.g., $UE_2$) located in the cell, such that its performance or throughput is unavoidably decreased.

Base stations BS1, BS2, BS3, . . . , BSN of individual cells employing the closed-loop MIMO system under a multi-cell environment transmit data to user equipments (UEs) located in the individual cells using the same codebook. In this case, based on a channel status between each base station and each UE, the individual cells transmit the data using an optimum precoding vector for each UE. In this case, precoding vectors for use in the individual UEs are not completely independent of each other, such that there is a correlation among them. Also, beam patterns caused by the precoding vectors overlap with each other, such that they mutually influence each other. Therefore, when each UE located in the cell receives data from a serving base station using its own optimum precoding vector appropriate for a channel status, one UE located at a cell edge may experience a high or strong inter-cell interference (ICI) due to the influence of an optimum precoding vector, which has been applied to another UE located in a neighbor cell by a base station of the neighbor cell. Thus, a user equipment for use in the closed-loop MIMO system may restrict the use of a specific precoding vector of a cell causing the interference, such that it can reduce the ICI influence under multi-cell environment simultaneously while reducing the mutual influence of used precoding vectors. In order to restrict the use of the precoding vector, it is preferable that a specific UE affected by interference recognizes a precoding matrix index (PMI) which should not be used in a neighbor cell causing the interference, and transmits the recognized PMI to the serving base station.

A user equipment (UE) located in of a serving cell is able to transmit channel state information (CSI) between the UE itself and a base station of the serving cell and/or another CSI between the UE itself and an interfering cell using an analog feedback. In this case, the above CSI may have a specific format, for example, a channel matrix, a channel covariance matrix, or singular vector(s) of this channel covariance matrix, quantized vector or matrix. The base station of the serving cell decides a codebook vector capable of being easily used by a user equipment (UE) and another codebook vector of an interfering cell giving the UE a large amount of interference, using CSI for the serving cell which is received from the UE, the CSI for the interfering cell which received from the UE, and information of a codebook owned by the base station. For example, in case of using a codebook for precoding, an restricted PMI of interfering-cell selected by the base station of the serving cell may be transferred to the interfering cell over a backbone network. In this case, the PMI, which has been decided and transferred by the base station of the serving cell, may be a restricted PMI for use in the interfering cell. The interfering-cell's base station, which has received the restricted PMI from the base station of the serving cell, may decide a PMI to be used at an UE of the interfering cell. Here, the decided PMI is selected from among codebook's PMIs except for the restricted PMI transferred from the serving cell. At this time, the base station of the interfering cell may use analog feedback information transferred from the UE located in the interfering cell.

According to another method, the base station of a serving cell may transmit interfering-cell's CSI received from the UE located at an edge or boundary of the serving cell to the base station of an interfering cell over a backbone network. The interfering-cell's base station receiving the CSI of the interfering cell may decide the restricted PMI, the use of which will be restricted in the interfering cell, using codebook information. The UE located in the interfering cell uses PMIs except for the restricted PMI. In more detail, this UE located in the interfering cell decides a PMI, which gives another UE of the serving cell the interference, upon receiving the CSI from the base station of the serving cell, and restricts the use of the decided PMI within the interfering cell, such that it can reduce the inter-cell interference (ICI). The above serving cell and the above interfering cell should be considered to be relatively to each other.

Figure 3:
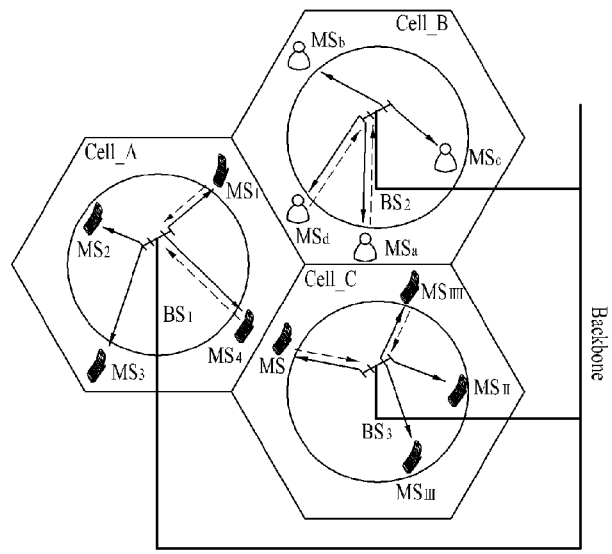
FIG. 3 illustrates a mobile station which transfers PMI information of an interfering cell to a serving base station so as to restrict the use of a precoding vector of the interfering cell according to an embodiment of the present invention.
Figure 3:
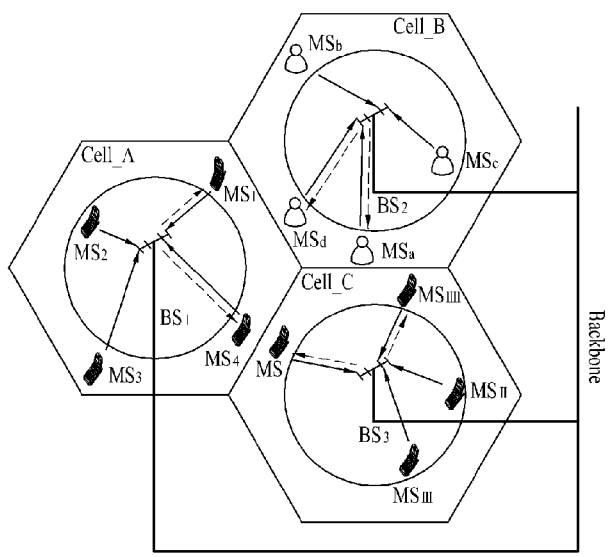

FIG. 3 illustrates a mobile station which transfers PMI information of an interfering cell to a serving base station so as to restrict the use of a precoding vector of the interfering cell according to an embodiment of the present invention.

In order to reduce the influence of the interfering cell giving a mobile station of a neighbor cell the interference, a mobile station which is allowed to transfer precoding vector information (PMI) of an interfering cell is decided as shown in FIGS. 3 (a) and (b).

FIG. 3 (a) is a conceptual diagram illustrating a mobile for transferring information restricting the use of a precoding vector of the interfering cell, and showing a method for employing a threshold value.

Referring to FIG. 3 (a), the base station of each cell may broadcast a threshold value, which is used to decide whether or not a mobile station of each cell is allowed to transfer PMI information of an interfering cell, to all mobile stations located at an edge or boundary of the cell. For example, in the A cell (Cell_A) of FIG. 3 (a), a base station $BS_1$ may broadcast a threshold value to mobile stations $MS_1$, $MS_2$, $MS_3$, and $MS_4$, as denoted by solid lines. In this case, the threshold value transferred to the mobile stations is decided at the base station based on a variety of values transferred from each mobile station of the cell, for example, CQI, SINR, geometry, CSI and the like. Based on a short-term reception SINR or a long-term reception SINR of all mobile stations, which is calculated based on SINR, channel information, and geometry information of mobile station (MS) location information, the threshold value may be decided based on the lower 10% of such SINRs or a pre-fixed SINR (e.g., −2.5 dB). If a threshold value is decided by the calculated reception SINR, this threshold value may be changeable with MS's conditions and/or location in the geometry. The above-mentioned threshold value may be equally applied to all cells, or different threshold values may also be applied to individual cells. The decided threshold value may be fixed, or may be periodically changed to another value at intervals of either a frame or a long time interval (e.g., 100 frames or a super-frame). If an SINR of a mobile station which have received the threshold value from a base station is less than the threshold value, the mobile station may be allowed to transmit information of the interfering cell to the base station. For example, in the A cell (Cell_A) of FIG. 3 (a), only two mobile stations $MS_1$ and $MS_4$ may transmit the interfering-cell information to the base station $BS_1$, as denoted by dotted lines. According to FIG. 3 (a), the base station transmits the threshold value, and then only the mobile station satisfying this threshold value is allowed to transmit the interfering-cell information.

FIG. 3 (b) is a conceptual diagram illustrating a mobile station transferring specific information used for restricting the use of a precoding vector of the interfering cell, and showing a method for employing a request signal and a confirmation signal.

Referring to FIG. 3 (b), all mobile stations (e.g., $MS_1$, $MS_2$, $MS_3$, and $MS_4$ of cell A (Cell_A)) experiencing interference from neighbor cells transmit request information to the base station so as to get a permission to transmit information of the interfering cell (solid lines). In this case, the base station selects a mobile station, which will be allowed to transmit interfering-cell information, among the above mobile stations, using SINR, CQI, and geometry information of the mobile stations, and then transmits a confirmation signal to two mobile stations $MS_1$ and $MS_4$ of the A cell (Cell_A) as denoted by dotted lines. Then, the mobile stations receiving the confirmation signal from the base station transmits information of the interfering cell to the base station. For example, if a mobile station located at an edge of the cell selected by the above-mentioned method estimates channel information of each of neighbor cells using signals received from the neighbor cells so as to reduce the influence of a strong interference caused by the neighbor cell. In this case, in order to decide a cell which applies the interference to the mobile station located at the cell edge, signal strengths (e.g., SINR or SIR, CQI and the like) from each neighbor cell to this mobile station located at the cell edge are calculated using each estimated neighbor-cell channel information, such that the level of interference caused by each neighbor cell is measured. The mobile station located at the cell edge (hereinafter may be referred to as edge-located mobile station) may decide one or more interfering cells giving the above edge-located mobile station the highest interference, using each cell's interference level calculated by the estimated channel information of the neighbor cell, and the number of decided interfering cells may be variable.

In FIG. 3, interfering-cell information transferred from the mobile station of the serving cell (Cell_A) may be PMI information or a CSI transferred via an analog feedback.

If the mobile station located at an edge or boundary of the serving cell transmits the PMI information, the base station of the interfering cell may directly use the above PMI information.

Otherwise, a mobile station of a serving cell may directly transmit CSI of an interfering cell to the base station of the interfering cell via an analog feedback, and the base station of the interfering cell may decide a PMI to be restricted within the interfering cell using the received CSI and codebook information.

Also, the mobile station of the serving cell may transmit the CSI of an interfering cell to the base station of the serving cell through analog feedback. In this case, the base station of the serving cell decides a PMI to be restricted in the interfering cell (hereinafter referred to as a restricted PMI), using the CSI and codebook information, and may then transmit the decided restricted PMI to the base station of the interfering cell.

Alternatively, the mobile station of the serving cell may transmit the CSI of an interfering cell to the base station of the serving cell through analog feedback, the base station of the serving cell then transmits the received CSI to the base station of the interfering cell, and then the base station of the interfering cell may decide a restricted PMI of the interfering cell using the received CSI and codebook information.

Also, the mobile station located at the cell edge may directly measure information of the interfering cell using the received signal, or may measure interference information of the cell causing the interference and information of the interfering cell using handover information. For example, if the mobile station located at the cell edge receives handover information, handover information applied to this edge-located mobile station may include a neighbor-cell ID (Cell_ID), a base-station ID (BS_ID), a Received Signal Strength Indication (RSSI) of the neighbor cell, etc. The mobile station located at the cell edge may decide a cell transferring the highest RSSI as an interfering cell, using the neighbor cells' RSSI contained in the received handover information. In case of measuring one or more interfering cells, corresponding cells or base stations may be determined to be interfering cells in descending numerical orders of their received RSSIs. The signal received in the mobile station located at the cell edge is represented by the following equation 3.

$$r_k(t) = H_k w_k s_k(t) + \sum_{\substack{i=j \\ i \neq k}}^{N} H_j w_j s_j(t) \qquad \text{[Equation 3]}$$

In Equation 3, a first term of the right side represents a signal which has been transferred from a serving cell to a mobile station contained in this serving cell, and a second term represents interference caused by neighbor cells. In this case, each mobile station located at the edge of the serving cell measures a precoding vector, which may give this mobile station the highest interference, using the estimated interfering-cell channel information and a codebook. For example, the following equation 4 is used to calculate a precoding gector of the interfering cell in a (2×2) MIMO system based on 'Rank-1 codebook'.

$$H_i \cdot w_k = \begin{bmatrix} h_{00} & h_{01} \\ h_{10} & h_{11} \end{bmatrix} \begin{bmatrix} w_k(0) \\ w_k(1) \end{bmatrix} = H_{eq}(k) \qquad \text{[Equation 4]}$$

$$W = \{w_1, w_2, \ldots, w_N\} \ k = 1, 2, \ldots, N$$

$$H_{eq}(k) = \begin{bmatrix} h_{00} \cdot w_k(0) + h_{01} \cdot w_k(1) \\ h_{10} \cdot w_k(1) + h_{11} \cdot w_k(1) \end{bmatrix} = \begin{bmatrix} h'_0 \\ h'_1 \end{bmatrix}$$

In Equation 4, W represents a Rank-1 codebook, and $w_1$, $w_2, \ldots, w_N$ represent precoding vectors contained in the codebook. $H_i$ is channel information of an i-th interfering cell, and $H_{eq}(k)$ is a channel value which has been calculated by interference channel information and a k-th precoding vector. The mobile station calculates a CQI, an SINR, or an SIR of the interfering cell using channel values of individual precoding vectors calculated by Equation 4, such that it can obtain one precoding vector having the highest interference. The precoding vector of the interfering cell may be performed in each period or a specific period, or may also be performed at intervals of any specified period. Restriction of each measured vector may be performed in each period or a specific period, or may also be at intervals of any specified period.

Figure 4:
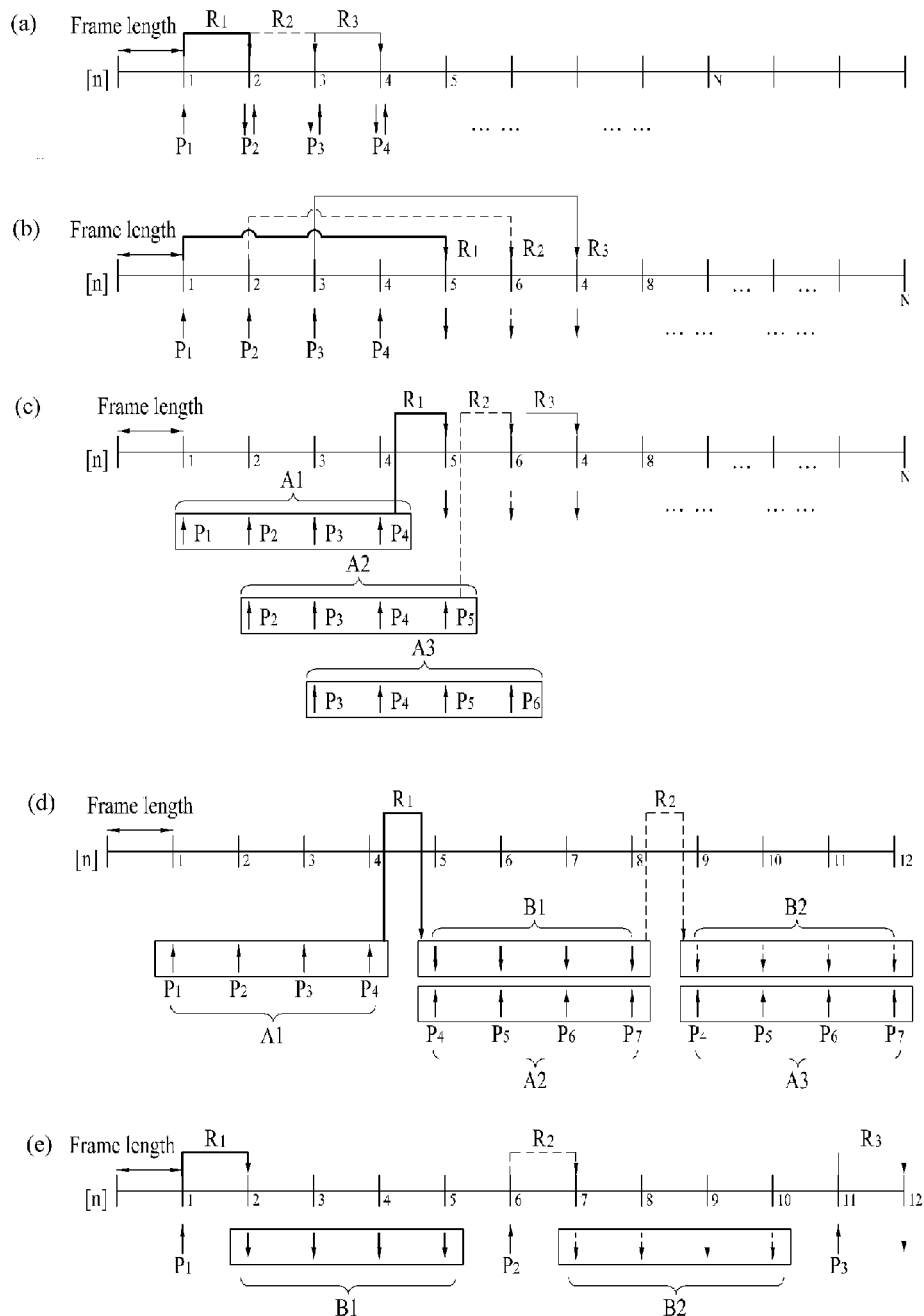
FIG. 4 illustrates a method for estimating a precoding matrix causing interference and restricting the precoding matrix for use at a mobile station of an interfering cell according to the present invention.

FIGS. 4 (a) to (e) are conceptual diagrams illustrating a method for estimating and restricting a precoding vector causing an interference by a mobile station of an interfering cell according to the present invention. In this case, one frame may be used as a unit of a period for calculating precoding vector information (PMI) of the interfering cell. In FIGS. 4 (a) to (e), '↑' indicates a time at which the precoding vector of an interfering cell is estimated, and '↓' indicates a time at which the interfering cell restricts the use of the estimated precoding vector within the interfering cell.

Referring to FIG. 4 (a), the mobile station located at the cell edge in each frame measures PMIs $P_1$, $P_2$, $P_3$, and $P_4$, which generate a large amount of interference in this mobile station, using channel information of the interfering cell. Each measured PMI may be set to a PMI, the use of which should be restricted in the measured interfering cell. Then, the interfering cell may restrict the use of the set PMIs in the following frames, as shown in $R_1$, $R_2$, and $R_3$. As shown in $R_1$ of FIG. 4 (a), the use restriction in the interfering cell of PMI $P_1$ measured at a time index 1 is performed in a time index 2. As shown in $R_2$ of FIG. 4 (a), the use restriction in the interfering cell of PMI $P_2$ measured at the time index 2 is performed in a time index 3. As shown in $R_3$ of FIG. 4 (a), the use restriction in the interfering cell of PMI $P_3$ measured at the time index 3 is performed in a time index 4.

Referring to FIG. 4 (b), a restricted PMI of the interfering cell is measured on a basis of each frame in the same manner as in FIG. 4 (a). The measured PMI is set to a restricted PMI of the interfering cell. Thereafter, the interfering cell may restrict the use of the set PMI in a specific frame located after predetermined intervals (e.g., after four frames). As can be seen from $R_1$ of FIG. 4 (b), the use restriction of the interfering cell by the PMI $P_1$ measured at a time index 1 is performed at a time index 5. As can be seen from $R_2$ of FIG. 4 (b), the use restriction of the interfering cell by the PMI $P_2$ measured at a time index 2 is performed at a time index 6. As can be seen from $R_3$ of FIG. 4 (b), the use restriction of the interfering cell by the PMI $P_3$ measured at a time index 3 is performed at a time index 7.

Referring to FIGS. 4 (c) and (d), specific PMI information, which is a plurality of PMIs for restriction fed back from each edge-located mobile station for a predetermined collection period (i.e., a predetermined frame period A1, A2, . . . ) may be used as either precoding vector information for restricting the use of PMI in the interfering cell or PMI information causing the inter-cell interference (ICI) when the interfering cell is used for the mobile station contained in this interfering cell. In this case, based on either statistical values of feedback information for each frame during the predetermined collection period, or a PMI causing the highest or strongest interference among the feedback information of individual frames during the predetermined collection period, a restricted PMI of the measured interfering cell may be established.

Referring to FIG. 4 (c), interfering-cell PMI information, which has been fed back for a collection time having a predetermined length (A1, A2, . . . ; for example, a length corresponding to four frames), is measured. This measurement may be repeatedly executed every frame. Based on the measurement value, a restricted PMI of the measured interfering cell may be established. The interfering cell may restrict the use of the established PMI in the next frame starting from the end part of the collection period having a predetermined length A1, A2, . . . . In FIG. 4 (c), PMI information of the interfering cell may be collected at time indexes 1, 2, 3, and 4, and be then transferred. Based on statistical values of the interfering-cell PMI information or a specific PMI causing the highest or strongest interference among the statistical values, a PMI of the interfering cell may be restricted at the time index 5. This processing may be repeated every frame. In more detail, PMI information of the interfering cell may be collected in time indexes 2, 3, 4, and 5, and be then transferred. Based on statistical values of the transferred interfering-cell PMI information or a specific PMI causing the highest or strongest interference among the statistical values, a PMI of the interfering cell may be restricted at the time index 6. In this way, PMI information of the interfering cell may be collected at time indexes 3, 4, 5, and 6, and be then transferred. Based on statistical values of the transferred interfering-cell PMI information or a specific PMI causing the highest or strongest interference among the statistical values, a PMI of the interfering cell may be restricted at the time index 7.

Referring to FIG. 4 (d), using feedback information which has been measured for a predetermined period having a predetermined length A1, A2, . . . shown in FIG. 4 (c), a PMI of the interference may be restricted for a restricted period having a predetermined length B1, B2, . . . . In this case, the length of a collection period having a predetermined length A1, A2, . . . during which information of the interference is collected, and the length of a restricted period having a predetermined length B1, B2, . . . during which the PMI of the interfering cell is restricted may not be fixed but variable. Also, a process for collecting interfering-cell information during the collection period having a predetermined length A1, A2, . . . need not always be executed every frame. For example, the mobile station located at the cell edge may transmit the interfering-cell information to the base station every super-frame, or may restrict the use of the PMI in the interfering cell during the super-frame using the transferred interfering-cell information. Referring to FIG. 4 (d), the PMI information of the interfering cell may be collected at time indexes 1, 2, 3 and 4, and be then transferred. Based on statistical values of the transferred interfering-cell PMI information or a specific PMI causing the highest or strongest interference among the statistical values, a PMI of the interfering cell may be restricted at the time indexes 5, 6, 7 and 8. In this way, PMI information of the interfering cell may be collected at time indexes 5, 6, 7, and 8, and be then transferred. Based on statistical values of the transferred interfering-cell PMI information or a specific PMI causing the highest or strongest interference among the statistical values, a PMI of the interfering cell may be restricted at the time indexes 9, 10, 11 and 12.

Referring to FIG. 4 (e), the edge-located mobile station measures precoding vector information (i.e., PMI) for restricting a PMI of the interfering cell at only a predetermined frame or time (e.g., time indexes 1, 6, . . . ), and feeds back the measured information to the base station of the interfering cell. The base station of the interfering cell may restrict the use of the interfering-cell PMI during a restricted frame having a predetermined length B1, B2, . . . using feedback information of the mobile station. Referring to FIG. 4 (e), the PMI information of the interfering cell may be collected at a time index 1, and be then transferred. Based on the transferred interfering-cell PMI information, a PMI of the interfering cell may be restricted at time indexes 2, 3, 4 and 5. Likewise, the PMI information of the interfering cell may be collected at a time index 6, and be then transferred. Based on the transferred interfering-cell PMI information, a PMI of the interfering cell may be restricted at time indexes 7, 8, 9 and 10.

The interfering-cell associated PMI information, which has been measured and fed back by the edge-located mobile station so as to restrict the use of a PMI in the interfering cell, may be grouped or established in a way different from the collection periods A1, A2, . . . or collection times (e.g., time indexes 1, 2, 3, . . . ) as shown in FIGS. 4 (*a*) to (*e*). Also, the interval for prohibiting the use of the restricted PMI in the interfering cell may be grouped or established in a way different from other restricted periods (e.g., B1, B2 . . . ) of FIGS. 4 (*a*) to (*e*).

In FIGS. 4 (*a*) to (*e*), the mobile station of the serving cell measures a CSI of the interfering cell, instead of PMIs $P_1$, $P_2$, $P_3$, and $P_4$, and transmits the measured CSI to the serving cell through an analog feedback. The serving cell may decide a restricted PMI of the interfering cell using the received CSI, and transmits the decided PMI to the base station of the interfering cell.

Alternatively, the mobile station of the serving cell measures a CSI of the interfering cell, and transmits the measured CSI to the base station of the serving cell through an analog feedback. The serving cell may transmit the received CSI to the base station of the interfering cell. The interfering cell may decide a restricted PMI of the interfering cell using the received CSI and codebook information.

Alternatively, the mobile station of the serving cell measures a CSI of the interfering cell, and transmits the measured CSI to the base station of the interfering cell thorough an analog feedback. The base station of the interfering cell may decide a restricted PMI of the interference using the received CSI and codebook information.

One or more interfering-cell PMI information collected from several periods may be directly used to restrict a PMI of the interfering cell, or may be statistically processed and used to restrict the PMI of the interfering cell.

A first range for collecting feedback information to restrict the PMI use of the interfering cell, and a second range for restricting another PMI available in the interfering cell may have a variety of combinations as shown in examples of FIGS. 4 (*a*) to (*e*).

In order to restrict a PMI of the interfering cell, the edge-located mobile station may measure a restricted PMI of the interfering cell for a predetermined period or interval and may then restrict the PMI of the interfering cell. In addition, in order to restrict the PMI of the interfering cell, the base station may transmit information of a feedback period of the restricted PMI for each mobile station to the edge-located mobile station on the basis of status information of individual mobile stations. Thus, the individual mobile stations may transmit the restricted PMI to the serving base station during the same and/or different periods. In this case, the interfering cell may statistically use feedback information having different periods such that it may restrict the use of a codebook within a predetermined interval. Otherwise, the interfering cell may restrict the use of a codebook according to a period of each feedback information.

In order to restrict the use of a PMI of the interfering cell in view of a frequency, interfering-cell PMI information being fed back from the edge-located mobile station may be set to a measurement PMI of each frequency band of the interfering cell, or may be set to a restricted PMI of either a whole band or a specific frequency band. If the edge-located mobile station measures PMI information of the interfering cell in each of N number of frequency band, N number of feedback information may be transmitted to the base station. Otherwise, if the PMI information of the interfering cell is measured in the whole frequency band, only one feedback information is transferred to the base station. Because of the use of the transmission feedback information, the use of a precoding vector in the interfering cell may be restricted in each frequency band, a whole frequency band, or a specific frequency band.

For example, if the edge-located mobile station feeds back P number of restricted PMIs of the interfering cell for M frequency bands from among N frequency bands to the serving base station, the use of the PMIs may be restricted in the interfering cell as shown in the following examples. A first example provides a method for restricting the use of a PMI for each frequency band causing the interference. In this first example, the interfering cell may restrict the use of a restricted PMI, which has been fed back from the edge-located mobile station, in M corresponding frequency bands. In a second example, the interfering cell may apply P restricted PMIs to the whole frequency band (i.e., N bands) such that it may be unable to use the P restricted PMIs. According to the above-mentioned examples, the interfering-cell PMI being fed back from the edge-located mobile station is applied to each band or the whole band, such that the PMI use of the interfering cell may be restricted.

Even in case that a base station of a cell transmits data to a mobile station using rank adaptation scheme for adaptively controlling the number of transmission streams according to a channel environment, the PMI restriction method according to the present invention may be used. For example, if the base station performs the rank adaptation on the mobile station using a specific rank (e.g., Rank 2), the edge-located mobile station calculates a restricted PMI of the interfering cell having the greatest influence according to the used rank using channel information of the interfering cell, and transmits the calculated PMI to the serving base station. The interfering cell, which has received the restricted PMI for each rank from the serving base station, allows each inner user of the interfering cell to use another sub-optimal PMI except for the PMI of the received rank.

In an example of the rank adaptation, when the edge-located mobile station measures PMI information of the interfering cell, it measures a restricted PMI corresponding to rank 1, instead of measuring restricted PMIs of all ranks, such that it can restrict the PMI using the measured restricted PMI. The interfering cell may restrict each inner-user mobile station of the interfering cell employing rank 1, using the measured precoding vector of rank 1. If the inner-user mobile station of the interfering cell employs rank 2, all rank-2 precoding vectors including the received rank-1 precoding vector may be restricted. In this way, in addition to the above case in which all the used ranks are restricted, only a mobile station employing the Rank 1 may be restricted using the Rank-1 restricted PMI measured by the edge-located mobile station.

As shown in FIG. 4, the edge-located mobile stations of each cell should transfer information of the measured interfering-cell information to their base stations or a base station of the interfering cell, using PMIs of the interfering cell measured at a specific period or time, such that the interfering cell causing the interference may use a PMI used for its own inner mobile station. A method for feeding back information of the interfering cell measured by the mobile station is shown in FIGS. 5 (*a*) and (*b*).

Figure 5:
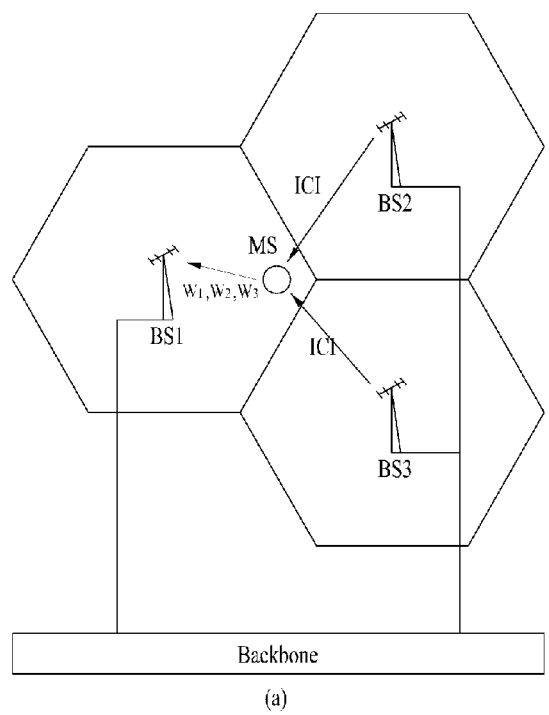
FIG. 5(a) is a conceptual diagram illustrating a method for allowing a mobile station located at an edge to feed back information of an interfering cell over a backbone network according to the present invention.
FIG. 5(b) is a conceptual diagram illustrating a method for allowing a mobile station located at an edge to feed back information of an interfering cell over a feedback channel established between the interfering cell and the mobile station according to the present invention.
Figure 5:
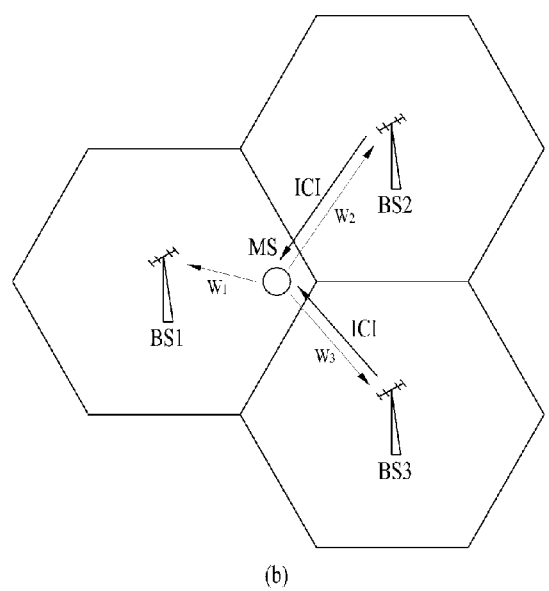

FIG. 5 (*a*) is a conceptual diagram illustrating a method for allowing a mobile station located at an edge to feed back information of an interfering cell over a backbone network according to the present invention.

Referring to FIG. 5 (a), the mobile station (MS) located at a cell edge receives a high or strong interference from neighbor base stations BS2 and BS3. For the convenience of description, the above mobile station (MS) may be hereinafter referred to as an edge-located mobile station. This edge-located mobile station (MS) measures PMIs $w_2$ and $w_3$ of the interfering cells so as to restrict the PMI use of the interfering cells greatly affecting this MS. Then, the mobile station (MS) feeds back not only the PMI $w_1$ between the mobile station (MS) and the serving base station BS1 but also other PMIs $w_2$ and $w_3$ of the interfering cell to the base station BS1 of the serving cell through a feedback channel toward the base station. Information fed back from the mobile station (MS) to the serving cell may include a Cell_ID, a BS_ID, a restricted PMI, a band indicator, etc.

If the above mobile station (MS) uses a handover message to perform PMI restriction, the mobile station may not feed back the Cell_ID and the BS_ID contained in the handover message. Also, if the mobile station restricts a PMI of the whole band, not restricting a PMI for each band, the band indicator may not be contained in the feedback information. If the mobile station restricts a PMI for each band, indicator for indicating the band may be contained in the feedback information. Interfering-cell information being fed back from the edge-located mobile station may be transferred to a base station of a corresponding interfering cell over a backbone network, or may be transferred to an upper layer, such that the PMI use of the interfering cell is unavoidably restricted. Referring to FIG. 5 (a), the edge-located mobile station transmits all information to the serving base station, and transmits information between the serving base station and the interfering-cell base station over the backbone network.

FIG. 5 (b) is a conceptual diagram illustrating a method for allowing a mobile station located at an edge to feed back information of an interfering cell over a feedback channel related to the interfering cell according to the present invention.

Referring to FIG. 5 (b), the edge-located mobile station (MS) may directly transmit interfering-cell information $w_2$ and $w_3$ over a feedback channel toward the base stations BS2 and BS3 of the interfering cell. In this case, the feedback channel between the edge-located mobile station (MS) and the base station BS2 or BS3 may be a common channel, or may be arbitrary channels allocated to each cell. If the feedback channel between the edge-located mobile station (MS) and the base station BS2 or BS3 of the interfering cell is a common channel, individual base stations may sort data using their unique codes or hopping signals so as to reduce errors caused by the overlapping of data which may occur while a feedback channel is used.

Base stations, which may directly receive PMIs for restricting the PMI use of the interfering cell from the edge-located mobile station over a feedback channel or may receive the same PMIs from a base station of another cell via such a feedback path, may make a table of restricted PMIs using the feedback PMIs so that they can restrict the use of PMIs in the interfering cell.

The PMI table made to restrict the PMI use of an inner mobile station of the interfering cell may be made in each frame according to the method of FIG. 3, or may also be made at intervals of a predetermined time. The table made of restricted PMIs transferred from the edge-located mobile station may be represented by a bitmap. This table or bitmap may be used to restrict PMIs of the interfering cell for a long period of time. If the table or bitmap made of restricted PMIs may be used for a long period of time, the above table or bitmap may be transferred to an upper layer, such that the table or bitmap can be used as downlink signals for a cell base station.

The interfering cell, which has received restricted PMI information over a backbone network or a feedback channel, restricts the PMI use of the inner mobile station of the interfering cell using the received information. A method for restricting the PMI use of the interfering cell using the restricted PMI can be classified into the following two methods.

In a first method, a base station (i.e., a interfering base station), which has received the restricted PMI information, does not allocate the restricted PMI to the mobile station served by the base station. In more detail, if a feedback PMI is equal to a restricted PMI received in the base station of the interfering cell when a reception status of the mobile station contained in the cell satisfies a threshold value for PMI restriction, the base station of the interfering cell transmits to an inner mobile station of the interfering cell a request signal requesting the inner mobile station of the interfering cell to feed back a PMI different from the restricted PMI received in the base station of the interfering cell. In this case, the inner mobile station of the interfering cell, which has received this feedback request signal, transmits another PMI (e.g., a sub-optimal PMI) except for pre-transmitted PMIs to the base station.

In a second method, a base station of the interfering cell, which has received the restricted PMI, transmits a threshold value for applying the restricted PMI information and the PMI restriction to inner mobile stations in the interfering cell, and allows inner mobile stations of the interfering cell to use the remaining PMIs except for the restricted PMIs. An inner mobile station of the interfering cell may be prohibited from the use of a specific PMI, which is indicated by the interfering cell, if the SINR at the inner mobile station is less than a threshold value which is received from the interfering cell. In this case, if the PMIs of the inner mobile stations of the interfering cell are restricted, PMIs of all the inner mobile stations of the interfering cell may be restricted according to a threshold value transferred from the base station, or may be variably restricted according to a reception status of each mobile station.

In sum, for the first method, only the base station of the interfering cell has the knowledge of the restricted PMI, whereas for the second method, both the base station and the mobile station in the interfering cell have the knowledge of the restricted PMI The threshold value for the above restriction may be decided at a base station of the interfering cell on the basis of information transferred from the inner mobile stations, and may also be decided according to the rule described above in connection with FIG. 3 (a). The threshold value is decided at the base station of the interfering cell based on a variety of values transferred from each inner mobile station of the interfering cell, for example, CQI, SINR, geometry, CSI and the like. Based on a short-term reception SINR or a long-term reception SINR of all the inner mobile stations, which is calculated by SINR, channel information, and geometry information of the inner mobile station (MS), the threshold value may be decided based on the lower 10% of such SINRs or a pre-fixed SINR (e.g., −2.5 dB). The decided threshold value may be fixed, or may be periodically changed to another value at intervals of either a frame or a long time interval (e.g., 100 frames or a super-frame).

The PMI restriction in the interfering cell may be used along with either a fractional frequency reuse (FFR) method or a collaborative MIMO method, such that it can more effectively reduce the influence of the inter-cell interference (ICI).

Figure 6:
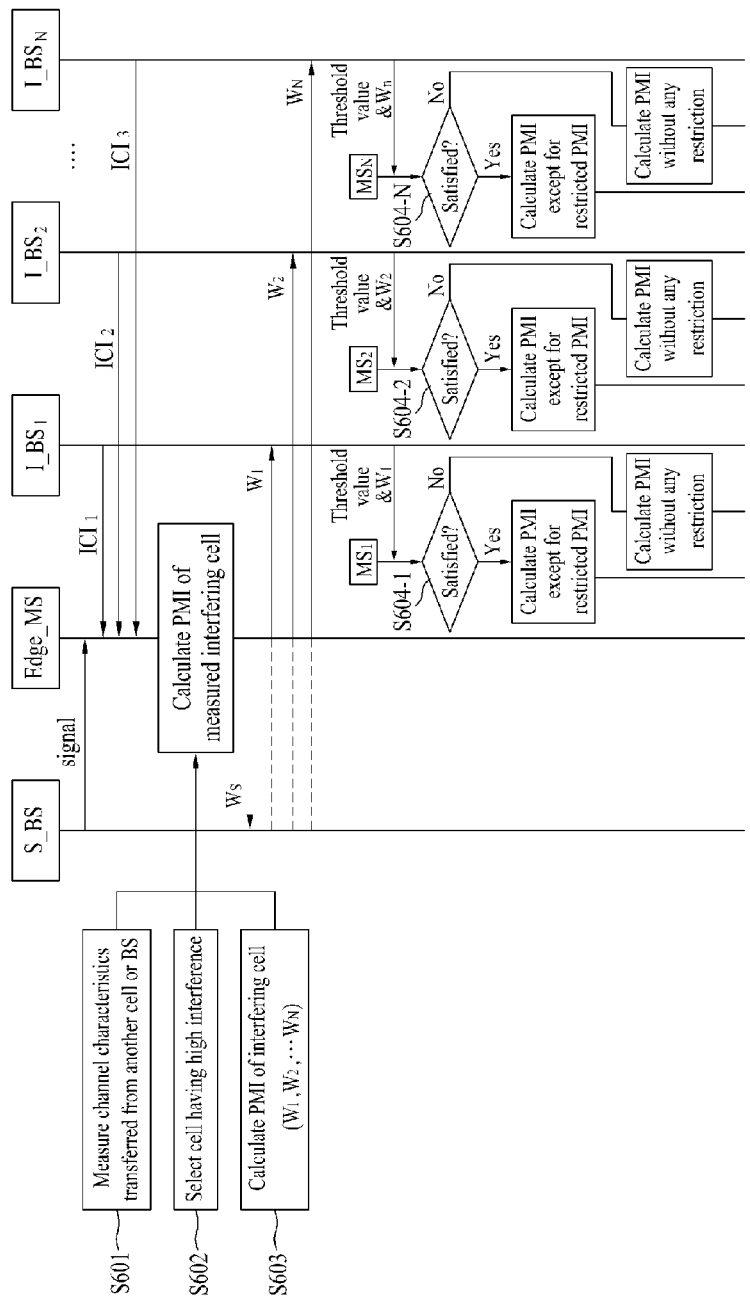
FIGS. 6 and 7 are conceptual diagrams illustrating a system for restricting the use of a PMI of an interfering cell according to the present invention.
Figure 7:
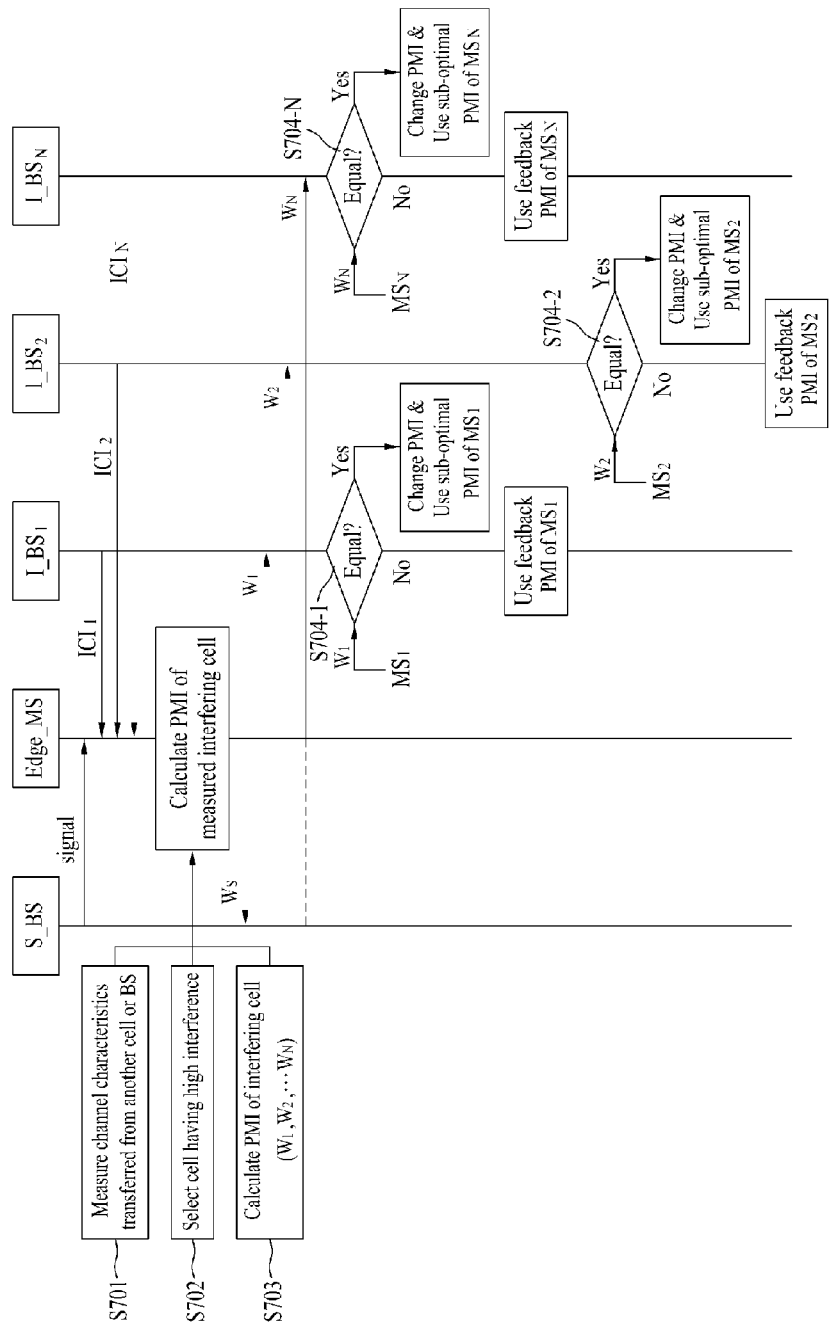

FIGS. 6 and 7 are conceptual diagrams illustrating a system for restricting the use of a PMI of an interfering cell according to the present invention.

In the closed-loop MIMO system in a multi-cell environment, a mobile station located at a cell edge is greatly interfered by a precoding vector used by another mobile station located in a neighbor cell. The edge-located mobile station has a performance or throughput lower than that of another mobile station located at an edge or boundary of the cell, due to the occurrence of inter-cell interference (ICI). In order to reduce the influence of ICI applied to the edge-located mobile station in a multi-cell environment, operations for restricting the PMI use of the interfering cell are shown in FIGS. 6 and 7.

FIG. 6 is a flow chart illustrating a method for allowing an interfering base station to broadcast information needed for PMI restriction, and deciding whether the mobile station contained in the interfering cell will restrict the PMI use.

Referring to FIG. 6, an edge-located mobile station Edge_MS measures channel characteristics transferred from neighbor cells or base stations of this neighbor cells, using signal received from the neighbor cells I_BS$_1$, I_BS$_2$, . . . I_BS$_N$ at step S601, decides one or more interfering cells causing high or strong interference at step S602, and estimates channel information of the decided interfering cell at step S603. The edge-located mobile station Edge_MS measures restricted PMI information $w_1, w_2, \ldots, w_N$, which gives the Edge_MS the highest influence, using the estimated interference channel and precoding vectors of a codebook. The restricted PMI information $w_1, w_2, \ldots, w_N$ measured by the mobile station Edge_MS is transferred to the serving base station S_BS of the mobile station Edge_MS or the interfering base stations I_BS$_1$, I_BS$_2$, . . . I_BS$_N$. Each interfering base station I_BS$_j$ (where j=1, 2, . . . , N) may broadcast the restricted PMI $w_j$ (where j=1, 2, . . . , N) to mobile stations contained in the interfering cell including the interfering base station itself. In addition, the above-mentioned interfering base station I_BS$_j$ may also broadcast a threshold value used for deciding whether to restrict the PMI use of respective mobile stations contained in the interfering cell. In this case, the threshold value may be an SINR value as an example. If the mobile station MS$_j$ (where j=1, 2, . . . , N) contained in the j-th interfering cell (j=1, 2, . . . , N) satisfies the following two tests, their PMI use may be restricted. In a first test, it is determined whether a restricted PMI $w_j$ broadcast from the interfering base station I_BS$_j$ is equal to a PMI initially measured by the mobile station MS$_j$. In a second test, it is determined whether the SINR of the mobile station MS$_j$ is greater than the threshold value broadcast from the interfering base station I_BS$_j$. If the compared PMIs of the above two tests are equal to each other and at the same time the SINR of the mobile station MS$_j$ is greater than the broadcast threshold value, a PMI is decided in a codebook except for the broadcast restricted PMI $w_j$ at step S604_j (where j=1, 2, . . . , N).

FIG. 7 is a flow chart illustrating a method for deciding at a base station of a interfering cell a mobile station which is prohibited from using a specific restricted PMI, using both restricted PMI information transmitted from a neighboring cell and information, e.g. SINR, transmitted from mobile stations in the interfering cell.

Referring to FIG. 7, an edge-located mobile station Edge_MS measures channel characteristics transferred from neighbor cells or base stations of this neighbor cells, using signals received from the neighbor cells I_BS$_1$, I_BS$_2$, . . . I_BS$_N$ at step S701, decides one or more interfering cells having high or strong interference at step S702, and estimates channel information of the decided interfering cell at step S703. The edge-located mobile station Edge_MS measures restricted PMIs $w_1, w_2, \ldots, w_N$, which gives the Edge_MS the highest influence, using the estimated interference channel and precoding vectors of a codebook. The restricted PMI information $w_1, w_2, \ldots, w_N$ measured by the mobile station Edge_MS is transferred to the serving base station S_BS of the mobile station or the interfering base stations I_BS$_1$, I_BS$_2$, . . . I_BS$_N$. Each interfering base station (I_BSj, where j=1, 2, . . . , N) may compare the received restricted PMI with a feedback PMI of the inner mobile station of the interfering cell at step S704_j (where j=1, 2, . . . , N). If the compared restricted PMI is equal to a feedback PMI of the inner mobile station of the interfering cell, the inner mobile station of the interfering cell has a restriction to use the restricted PMI. In this case, the interfering-cell inner mobile station, which is prohibited from using a restricted PMI, uses a suboptimal precoding vector, and receives data based on a sub-optimal precoding vector from the base station.

Figure 8:
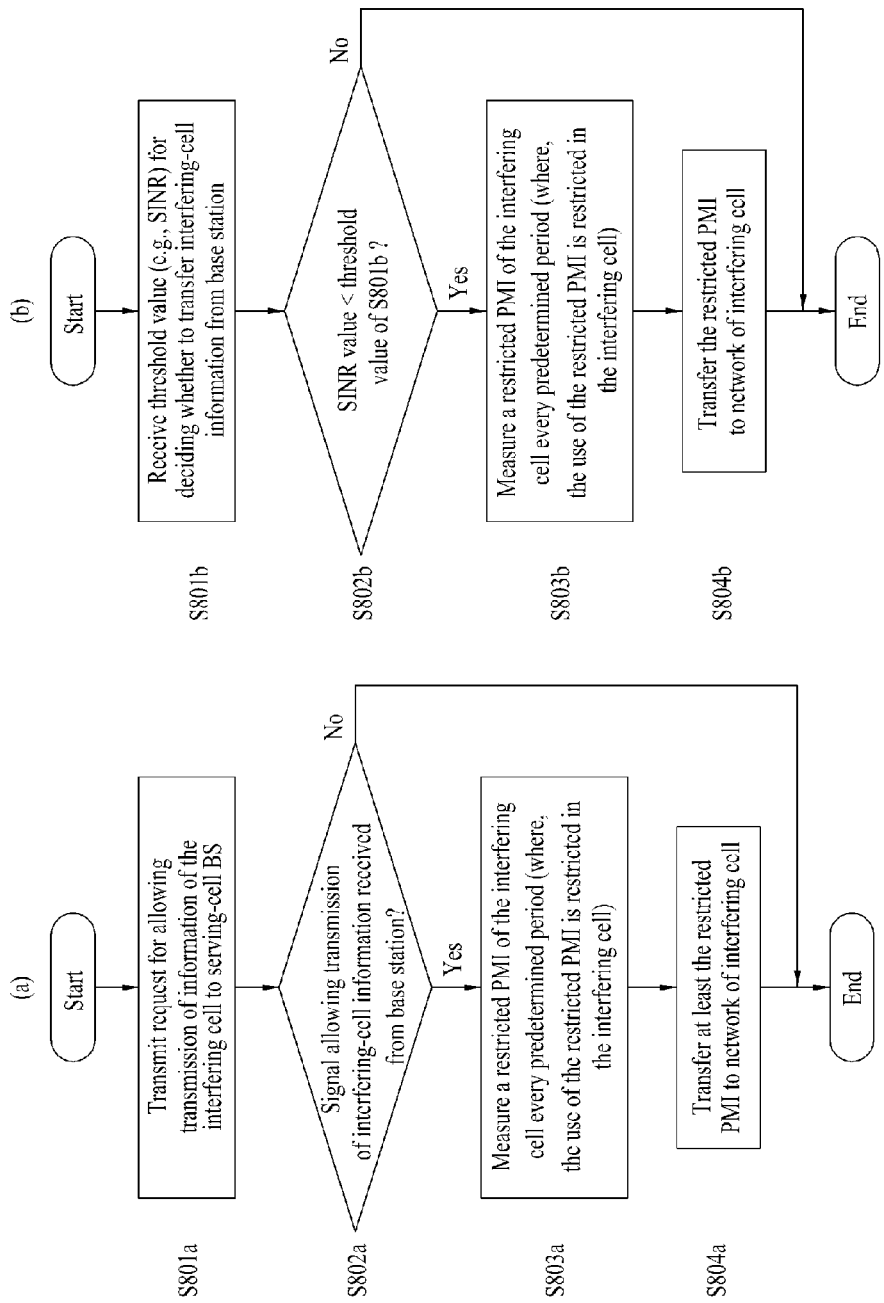
FIG. 8 illustrates a method for avoiding an inter-cell interference (ICI) in a network of a wireless communication system, and showing an internal processing step of a mobile station located at an edge of a serving cell.

FIGS. 8 (a) and (b) are flow charts illustrating method for avoiding an inter-cell interference (ICI) in a network of a wireless communication network according to the present invention, and showing an internal processing step of a mobile station located at an edge of a serving cell.

FIG. 8 (a) is a flow chart illustrating a method for asking a network entity (e.g., a base station) of the serving cell to confirm whether or not a mobile station located at an edge or boundary of the serving cell transmits PMI information of the interfering cell to a network of the interfering cell.

Referring to FIG. 8 (a), the mobile station located at an edge or boundary of the serving cell measures PMI information of the interfering cell which interferes the mobile station, and transmits a request message for deciding whether it is allowed to transfer the PMI information to the interfering cell at step S801a. The base station of the serving cell may previously include a threshold value used for deciding whether to transfer the PMI information of the interfering cell to the interfering cell. This threshold value may be, for example, an SINR value. The base station receiving the request message of the step S801a may compare the SINR value of the requesting mobile station with the pre-included threshold value (not shown in FIG. 8 (a)). For example, if the SINR value of the above mobile station is lower than the threshold value, the base station may transfer a message for allowing the mobile station to transfer interfering-cell PMI information to the interfering cell. If the mobile station contained in the serving cell does not receive the above-mentioned message from the base station, the restricted PMI is not transferred to the interfering cell at step S802a. On the contrary, if the mobile station contained in the serving cell receives the above-mentioned message from the base station, it may measure one or more restricted PMIs, the use of which will be restricted in the interfering cell causing the interference in association with the mobile station itself among neighbor cells adjacent to the serving cell, at intervals of a predetermined time at step S803a. Thereafter, this mobile station may transfer one or more measured restricted PMIs to a network of the interfering cell at step S804a.

FIG. 8 (b) is a flow chart illustrating a method for transferring, at a base station of a serving cell, a threshold value used for deciding whether to transfer information of the interfering cell to mobile stations contained in the serving cell, and deciding, at a mobile station in the serving cell, whether to transfer the restricted PMI to the interfering cell based on the transferred threshold value. As can be seen from the method of FIG. 8 (a), the base station decides whether to transfer the restricted PMI to the interfering cell according to the method of FIG. 8 (a). On the contrary, as can be seen from FIG. 8 (b), each mobile station contained in the serving cell decides whether to transfer the restricted PMI to the interfering cell.

In FIG. 8 (b), each mobile station may receive a threshold value (e.g., SINR value), which is used at a mobile station to decide whether to transfer information of the interfering cell causing the interference in the mobile station itself to the interfering cell, from the base station at step S801b. At step S802b, each mobile station may decide whether its own SINR value is lower than the threshold value of the step S801b. If the SINR value is greater than the threshold value at step S802b, the restricted PMI information is not transferred to the interfering cell. Otherwise, if the SINR value is less than the threshold value at step S802b, each mobile station may measure the restricted PMI, the use of which should be restricted in the interfering cell causing the interference in each mobile station from among neighbor cells adjacent to the serving cell, at intervals of a predetermined time at step S803b. The measured restricted PMI may be transferred to a network of the interfering cell at step S804b.

The above steps S804a and/or S804b may include a step for transferring one or more restricted PMIs of the interfering cell to the network of the serving cell, and another step for transferring one or more restricted PMIs transferred to the network of the serving cell to the network of the interfering cell over a backbone network.

The measuring of one or more restricted PMIs in the embodiments of FIGS. 8 (a) and (b) may be performed on the basis of interfering-cell information which has been directly measured by signals received from the interfering cell. Alternatively, the above-mentioned measuring of one or more restricted PMIs may also be performed on the basis of handover information.

In another way, the above operation for transferring the measured one or more restricted PMIs to the network of the interfering cell at steps S804a and S804b may also be performed over a feedback channel related to the network of the interfering cell. Also, one or more restricted PMIs may be measured according to individual ranks.

Figure 9:
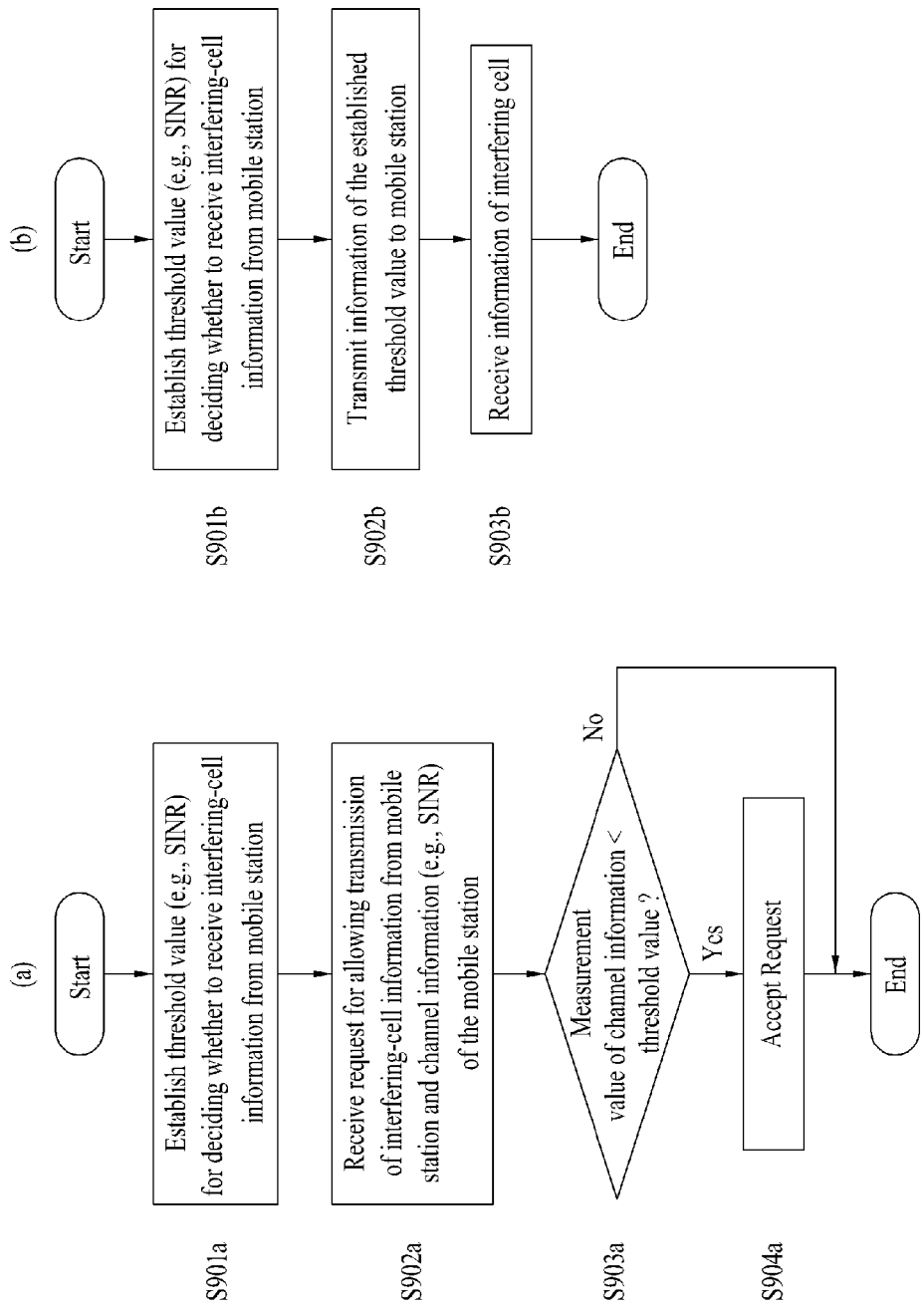
FIG. 9 illustrates a method for avoiding an inter-cell interference (ICI) in a network of a wireless communication system, and showing an internal processing step of a network entity (e.g., a base station) of a serving cell according to the present invention.

FIGS. 9 (a) and (b) are flow charts illustrating methods for avoiding an inter-cell interference (ICI) in a network of a wireless communication system according to the present invention. For example, FIGS. 9 (a) and (b) show internal processing steps of a network (i.e., a base station) of the serving cell.

FIG. 9 (a) is a flow chart illustrating a method for deciding, at a base station, the allowance or disallowance of a specific request from a mobile station of the serving cell asking the base station to allow for the mobile stations to transfer information of the interfering cell.

The base station may set a threshold value (e.g., SINR) used for deciding whether to receive information of the interfering cell, which causes the interference in a mobile station contained in the serving cell among neighbor cells adjacent to the serving cell, from the mobile station at step S901a. At step S902a, the base station may receive not only a request for allowing transmission of the interfering-cell information but also channel information (e.g., SINR) of this mobile station from a mobile station belonging to the serving cell. Then, at step S903a, the base station decides whether the measurement value of the received channel information is less than the threshold value of the step S901a. If it is determined that the measurement value of the received channel information is less than the threshold value of the step S901a, the request from the mobile station may be accepted at step S904a. Alternatively, at steps S903a and S904a, there may be used a method for deciding whether the comparison result between the channel information and the threshold value has a predetermined relationship.

FIG. 9 (b) is a flow chart illustrating a method for broadcasting a threshold value to mobile stations contained in the serving cell by a base station of the serving cell, wherein the threshold value is used to decide whether the operation for enabling the base station of the serving cell to transmit the interfering-cell information is acceptable.

At step S901b, a threshold value for deciding whether to receive information of the interfering cell, causing the interference in a mobile station belonging to the serving cell among neighbor cells adjacent to the serving cell, from the mobile station is established. At step S902b, information related to the established threshold value is transferred to the mobile station. The information related to the transferred threshold value may be received in mobile stations contained in the serving cell. Each mobile station which has received the information related to the threshold value may decide whether to transfer the interfering-cell information to a network (e.g., a base station) of the serving cell on the basis of the threshold value. If a certain mobile station transmits information of the interfering cell, the base station may receive this interfering-cell information at step S903b.

In this case, the threshold value used for deciding whether to receive the interfering-cell information from the mobile station may be established on the basis of feedback information of the base station. In this case, the feedback information may include at least one of a CQI, an SINR, a CSI, and geometry information.

Figure 10:
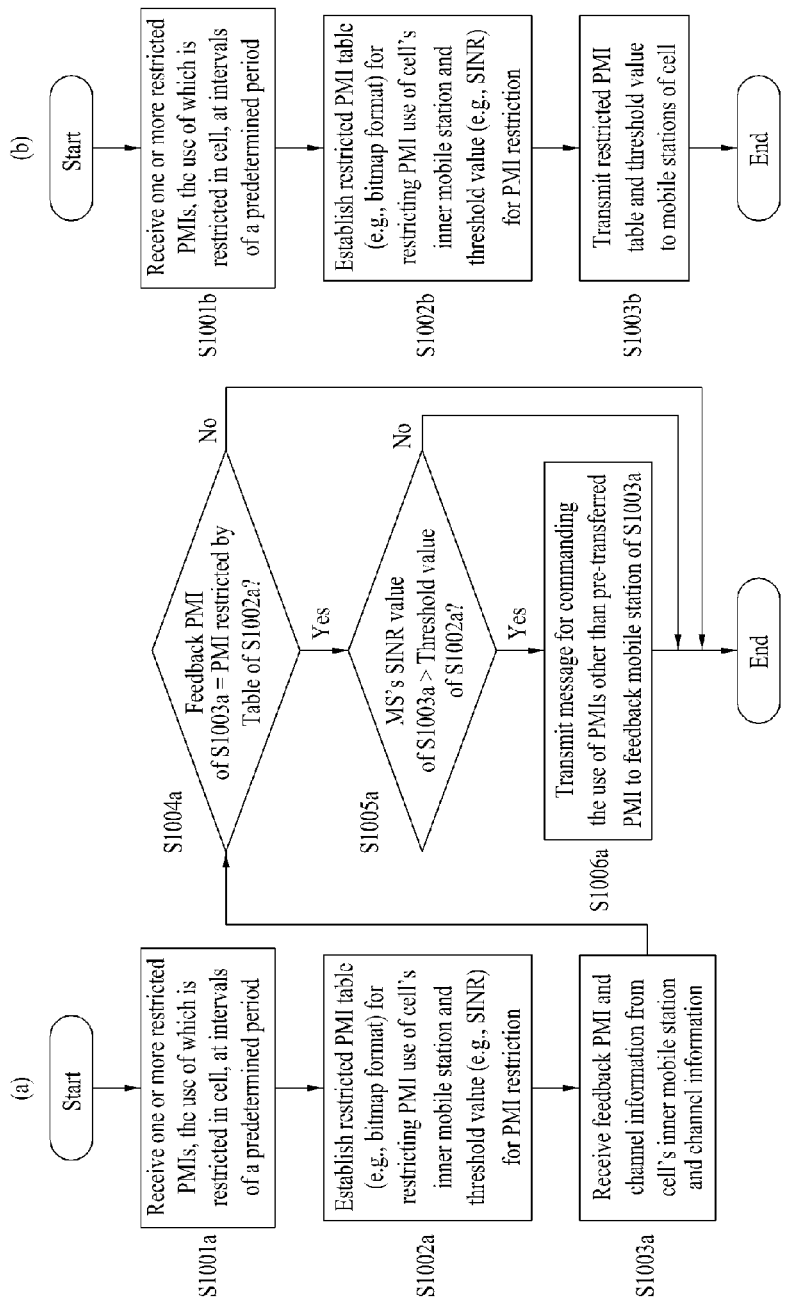
FIG. 10 illustrates a method for avoiding an inter-cell interference (ICI) in a network of a wireless communication system, and showing an internal processing step of a network entity of the interfering cell (i.e., a base station of the interfering cell) according to the present invention.

FIGS. 10 (a) and (b) are flow charts illustrating methods for avoiding the inter-cell interference (ICI) in a network of a wireless communication system according to the present invention. For example, FIGS. 10 (a) and (b) show internal processing steps of a network entity of the interfering cell (i.e., a base station of the interfering cell).

In FIG. 10 (a), the base station of the interfering cell may receive one or more restricted PMIs, the use of which should be restricted in the interfering cell, at intervals of a predetermined time at step S1001a. For example, the predetermined time may be easily understood by referring to FIGS. 4 (a) to (e). Then, the base station may establish not only a restricted PMI table used for restricting the PMI use of the mobile station contained in the interfering cell, but also a threshold value used for deciding whether to restrict the PMI, using one or more received restricted PMIs at step S1002a. In this case, the restricted PMI table may be represented by a bitmap format, the threshold value may be an SINR value as an example, and the restricted PMI table may include restricted PMI information, the use of which should be restricted in the interfering cell. Thereafter, the base station of the interfering cell may receive a feedback PMI and channel information from the mobile station contained in the interfering cell at step S1003a. At step S1004a, the base station of the interfering cell may decide whether the feedback PMI of the step S1003a is a specific PMI restricted by the table of the step S1002a. If the feedback PMI is not determined to be the specific PMI, the use of which need not be restricted, at step S1004a, then all the processes are finished. Otherwise, if the feedback PMI is determined to be the specific PMI, the use of which should be restricted, it is determined at step S1005a whether a mobile station's feedback SINR value of the step S1003a is greater than the threshold value of the step S1002a. If the above feedback SINR value of the mobile station is not greater than the threshold value at step S1005a, all the processes are finished. On the contrary, if the above-mentioned feedback SINR value of the mobile station is greater than the threshold value at step S1005*a*, the base station may transmit a specific message for using the remaining PMIs except for pre-transferred PMIs to the feedback mobile station at step S1006*a*. At step S1006*a*, the request for restricting the use of the restricted PMI may be performed for each band used by the mobile station contained in the interfering cell.

It can be easily understood in the flow chart of FIG. 10 (*a*) that the steps S1004*a* and S1005*a* can be changed in order without departing from the spirit of the present invention, which means that comparing the mobile station's feedback SINR value with the threshold value is performed before comparing the PMI fed back from the mobile station with the restricted PMI.

In FIG. 10 (*b*), the base station of the interfering cell may receive one or more restricted PMIs, the use of which should be restricted in the interfering cell, at intervals of a predetermined time at step S1001*b*. Then, the base station of the interfering cell may establish not only a restricted PMI table used for restricting the PMI use of the mobile station contained in the interfering cell, but also a threshold value used for PMI restriction at step S1002*b*. Thereafter, the base station of the interfering cell may transfer the established restricted PMI table and the established threshold value to mobile stations contained in the cell at step S1003*b*.

At steps S1001*a* and S1001*b*, one or more restricted PMIs, the use of which should be restricted in the interfering cell, may be received from a cell adjacent to the interfering cell over a backbone network interconnecting the interfering cell and its neighbor cell. Alternatively, at steps S1001*a* and S1001*b*, one or more restricted PMIs, the use of which should be restricted in the interfering cell, may also be received over a feedback channel established between the edge mobile station of the cell adjacent to the interfering cell and the network of this interfering cell. In addition, at steps S1001*a* and S1001*b*, one or more restricted PMIs, the use of which should be restricted in the cell, may be measured according to individual ranks. In this case, if the interfering cell restricts the inner-user mobile station of the interfering cell employing the Rank 1 using a precoding vector measured at the Rank 1, and the inner-user mobile station of the interfering cell uses the Rank 2, all Rank-2 precoding vectors including the received Rank-1 precoding vector may be restricted. In this way, in addition to the above case in which all the used ranks are restricted, only a mobile station employing the Rank 1 may also be restricted using the Rank-1 restricted PMI measured by the edge-located mobile station.

The restricted PMI contained in the above-mentioned restricted PMI table may be set on the basis of statistical values of one or more restricted PMIs received at steps S1001*a* and S1001*b*, or may also be set to a restricted PMI causing the highest or largest interference among one or more restricted PMIs received at steps S1001*a* and S1001*b*. Also, the restricted PMI table may be represented by a bitmap format, and may be transferred to an upper layer such that it may be used as downlink signaling information.

Figure 11:
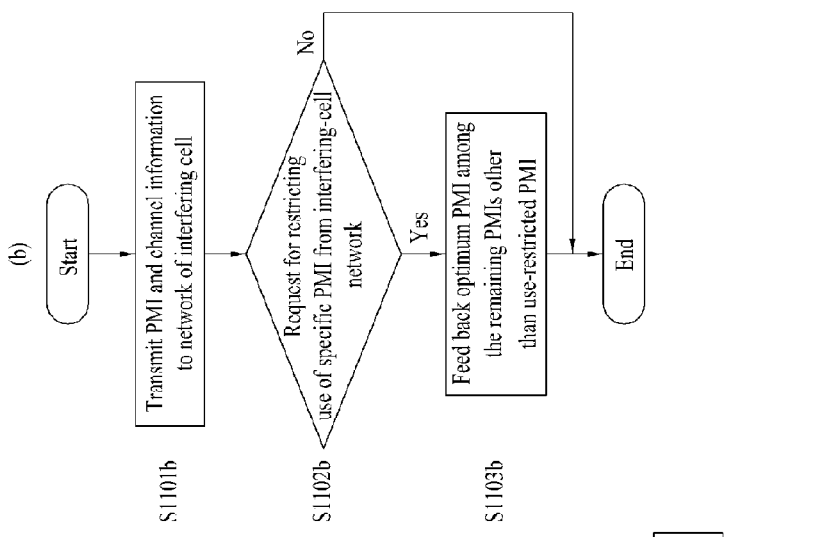
FIG. 11 illustrates a method for avoiding an inter-cell interference (ICI) in a network of a wireless communication system, and showing an internal processing step of a mobile station contained in an interfering cell according to the present invention.
Figure 11:
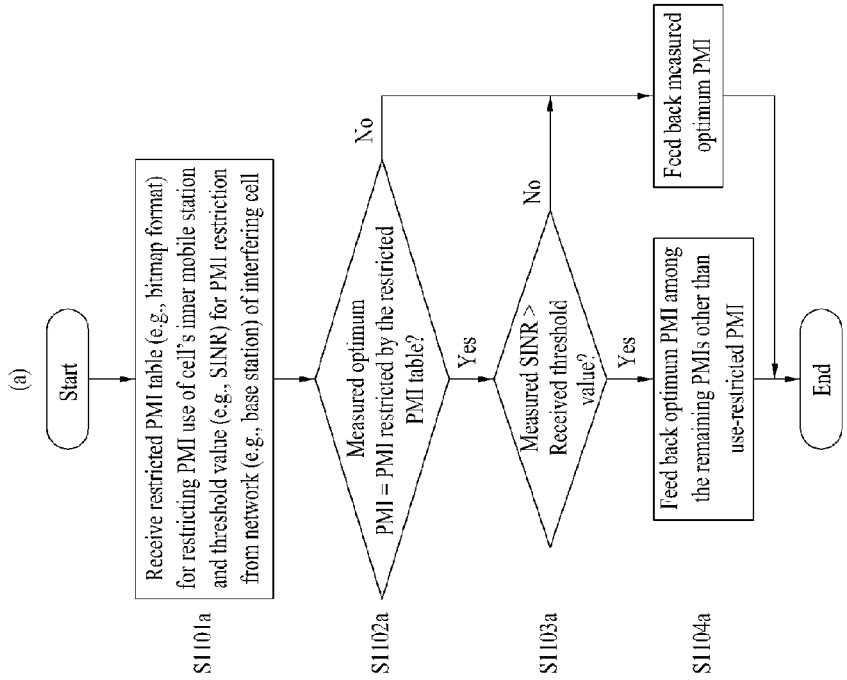

FIGS. 11 (*a*) and 11 (*b*) are flow charts illustrating methods for avoiding the inter-cell interference (ICI) in a network of a wireless communication system according to the present invention. For example, FIGS. 11 (*a*) and (*b*) show internal processing steps of a mobile station located in the interfering cell.

Referring to FIG. 11 (*a*), the mobile station contained in the interfering cell may receive not only a restricted PMI table for restricting the PMI use but also a threshold value used for the PMI restriction from a network of the interfering cell at step S1101*a*. In this case, for example, the network of the interfering cell may be a base station of the interfering cell, and the threshold value may be set to the SINR value as an example. Then, at step S1102*a*, each mobile station of the interfering cell determines whether an optimum PMI measured by each mobile station is a restricted PMI to be restricted by the restricted PMI table which has been received at the above step S1101*a*. If the optimum PMI is not the above restricted PMI to be restricted by the restricted PMI table at step S1102*a*, the measured optimum PMI is fed back to the network of the interfering cell at step S1102*a*. Otherwise, if the optimum PMI is equal to the above restricted PMI at step S1102*a*, it is determined whether the measured SINR value is greater than the received threshold value at step S1103*a*. If the measured SINR value is not greater than the threshold value at step S1103*a*, the measured optimum PMI is fed back to the network of the interfering cell. On the contrary, if the measured SINR value is greater than the threshold value at step S1103*a*, each mobile station of the interfering cell may perform a feedback of an optimum PMI among the remaining PMIs except for the restricted PMIs requested by the restricted PMI table at step S1104*a*.

It can be easily understood in the flow chart of FIG. 11 (*a*) that the steps S1102*a* and S1103*a* can be changed in order without departing from the spirit of the present invention, which means that comparing the mobile station's feedback SINR value with the threshold value is performed before comparing the PMI fed back from the mobile station with the restricted PMI.

Referring to FIG. 11 (*b*), the mobile station contained in the interfering cell may transmit PMI information and channel information to the network of the interfering cell at step S1101*b*. Then, at step S1102*b*, the mobile station may receive a request for restricting the use of a specific restricted PMI from the network of the interfering cell. If the mobile station receives the above-mentioned request, it may feed back an optimum PMI among the remaining PMIs except for the restricted PMIs at step S1103*b*.

FIGS. 6 to 11 have exemplarily disclosed methods for deciding, at the mobile station of the serving cell, a restricted PMI of the interfering cell, and then transmitting the decided PMI to the base station of the interfering cell over a backbone network or directly transmitting the decided PMI to the base station of the interfering cell. However, as previously disclosed in FIGS. 3 (*a*) and (*b*), the mobile station of the serving cell measures a CSI of the interfering cell, transmits the measured CSI to the base station of the serving cell or another base station of the interfering cell via an analog feedback. The restricted PMI of the interfering cell may be decided by the base station of the serving cell or the base station of the interfering cell using the CSI transferred from the mobile station of the serving cell. In other words, the base station of the serving cell may decide a restricted PMI of the interfering cell using the CSI received from the mobile station of the serving cell, and may then transfer the decided PMI to the base station of the interfering cell. Alternatively, the base station of the serving cell may transfer the CSI of the interfering cell to the base station of the interfering cell, and the base station of the interfering cell may decide a restricted PMI of the interfering cell using the received CSI and the codebook information.

In the above-mentioned embodiments of the present invention, the information transferred from the edge-located mobile station to the interfering cell has been defined as a restricted PMI, the use of which is restricted in the interfering cell.

However, according to another embodiment of the present invention, the information transferred from the edge-located mobile station to the interfering cell may be defined as a requested PMI to be used by the interfering cell. In other words, if the edge-located mobile station transmits at least one PMI information to the interfering cell, the interfering cell may select an optimum PMI from among the at least one PMI transmitted from the edge-located mobile station, and may then use the selected optimum PMI for a specific mobile station contained in the interfering cell itself. It is obvious to those skilled in the art that a method for using the requested PMI can be easily combined with all the above-mentioned embodiments of the present invention. Herein, 'requested PMI' indicates the PMI which is being used in a neighboring cell and causes the weakest interference to a mobile station in a cell adjacent to the neighboring cell.

<Use Restriction or Use Request of either Base-Codebook Vector or Base-Codebook Matrix>

If a transmitter has $N_t$ antennas and a rank is $N_r$, each element of a codebook $C_{Nt \times Nr}$ (i.e., a codebook set $C_{Nt \times Nr}$) may be defined as the product of an element selected from a concatenation codebook $A_{Nt \times Nt}$ (i.e., a concatenation codebook set $A_{Nt \times Nt}$) and another element selected from a base codebook $B_{Nt \times Nr}$ (i.e., a base codebook set $B_{Nt \times Nr}$), or may be defined as the product of an element selected from a base codebook $B_{Nt \times Nt}$ (i.e., a base codebook set $B_{Nt \times Nt}$) and another element selected from a concatenation codebook $A_{Nt \times Nr}$ (i.e., a concatenation codebook $A_{Nt \times Nr}$). Next, a method for restricting the use of a precoding vector in the interfering cell in case of using the above-mentioned codebook will hereinafter be described in detail.

In the above-defined codebook, if the number of elements of the concatenation codebook $A_{Nt \times Nt}$ is set to 1, the number of elements of the base codebook $B_{Nt \times Nr}$ is set to m, and the number of elements of the codebook $C_{Nt \times Nr}$ is set to n, the relationship of n=m×1 can be obtained. Individual elements $A^i_{Nt \times Nt}$ (where i=0, 1, 2, ..., 1−1) of the concatenation codebook $A_{Nt \times Nt}$ may have a structure of an $N_t \times N_t$ matrix, individual elements $B^i_{Nt \times Nr}$ (where i=0, 1, 2, ..., m−1) of the base codebook $B_{Nt \times Nr}$ may have a structure of an $N_t \times N_r$ matrix, and individual elements $C^i_{Nt \times Nr}$ (where i=0, 1, 2, ..., n−1) of the codebook $C_{Nt \times Nr}$ may have a structure of an $N_t \times N_r$ matrix. Thus, the concatenation codebook $A_{Nt \times Nt}$ may be defined by the set of $N_t \times N_t$ matrixes, the base codebook $B_{Nt \times Nr}$ may be defined by the set of $N_t \times N_r$ matrixes, and the codebook $C_{Nt \times Nr}$ may be defined by the set of $N_t \times N_r$ matrixes. The above-mentioned relationship may be represented by the following equations 5 and 6. The above relationship may also be easily applied to the cases of the concatenation codebook $A_{Nt \times Nr}$ and the base codebook $B_{Nt \times Nt}$. For example, as can be seen from Equation 6, $C^p_{Nt \times Nr}$ is equal to $B^q_{Nt \times Nt} \times A^r_{Nt \times Nr}$, as denoted by $C^p_{Nt \times Nr} = B^q_{Nt \times Nt} \times A^r_{Nt \times Nr}$.

$$A_{NtxNt} = \{A^0_{NtxNt}, A^1_{NtxNt}, A^2_{NtxNt}, \ldots, A^{l-1}_{NtxNt}\}$$
$$B_{NtxNr} = \{B^0_{NtxNr}, B^1_{NtxNr}, B^2_{NtxNr}, \ldots, B^{m-1}_{NtxNr}\}$$
$$C_{NtxNr} = \{C^0_{NtxNr}, C^1_{NtxNr}, C^2_{NtxNr}, \ldots, C^{n-1}_{NtxNr}\}$$
[Equation 5]

$$C^p_{N_t \times N_r} = A^q_{N_t \times N_t} \times B^r_{N_t \times N_r}$$
$$= \begin{bmatrix} p^q_{0,0} & \cdots & p^q_{0,(N_t-1)} \\ \vdots & \ddots & \vdots \\ p^q_{(N_t-1),0} & \cdots & p^q_{(N_t-1),(N_t-1)} \end{bmatrix}$$
$$\begin{bmatrix} w^r_{0,0} & \cdots & w^r_{0,(N_r-1)} \\ \vdots & \ddots & \vdots \\ w^r_{(N_t-1),0} & \cdots & w^r_{(N_t-1),(N_r-1)} \end{bmatrix}$$
[Equation 6]

Furthermore, provided that $C_t$ is a precoder at a time (t) and $C_{t−1}$ is a precoder at a time (t−1), the following equation 7 may be provided, and this equation 7 may also be easily applied to the cases of the concatenation codebook $A_{Nt \times Nr}$, and the base codebook $B_{Nt \times Nt}$.

$$C_0 = A_{N_t \times N_t} \times B_{N_t \times N_r}$$
$$C_t = A_{N_t \times N_t} \times C_{t-1}$$
[Equation 7]

Figure 12:
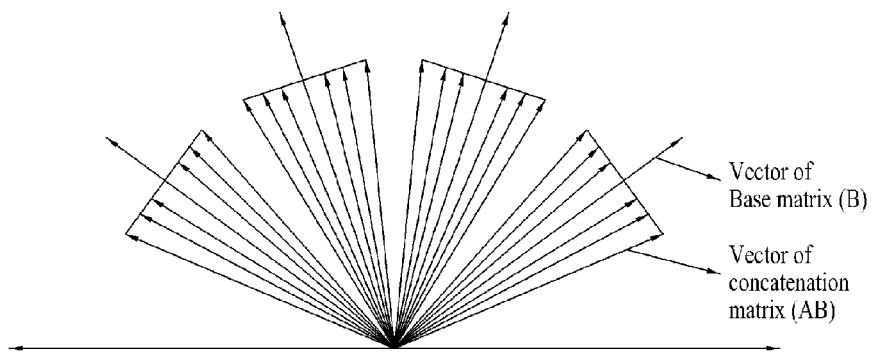
FIG. 12 illustrates a method for removing an inter-cell interference (ICI) according to another embodiment of the present invention.

FIG. 12 shows the concept of Equation 6.

Provided that the number of elements of the concatenation codebook $A_{Nt \times Nt}$ is '1', '1' elements contained in the concatenation codebook $A_{Nt \times Nt}$ may be multiplied by respective elements of the base codebook $B_{Nt \times Nr}$. Therefore, '1' different elements may be generated in individual elements of the base codebook. In this case, '1' different codebook elements generated by individual elements of the base codebook may be considered to be one group. In this case, provided that the base codebook has m elements, n (where n=m×1) codebook elements generated by the base codebook and the concatenation codebook may be divided into a total of m groups. Each group may consist of one codebook element.

FIG. 12 shows $N_t \times N_r$ concatenation vectors generated by a base matrix having $N_r$ vectors and a concatenation matrix having $N_t$ rows as represented by Equation 6. In this case, as shown in FIG. 12, it is considered that a specific matrix corresponding to one element of the codebook $C_{Nt \times Nr}$ is divided into vector units.

If $N_r$=1, namely, if the rank is 1, each element of the base codebook $B_{Nt \times 1}$ and the codebook $C_{Nt \times 1}$ is represented by a matrix (i.e., a vector) having only one column, such that it can be easily represented by a diagram. In this case, each element of the codebook $C_{Nt \times 1}$ and each element of the base codebook $B_{Nt \times 1}$ may also be represented in a similar way as in FIG. 12.

Each of the base codebook and the concatenation codebook capable of forming the codebook may consist of a predetermined fixed codebook or a variable codebook which has been fed back at a long-term based period or a short-term based period. The individual consisting methods may be selected independent of each other. Also, the base codebook and the concatenation codebook may be fed back at different periods which are independent of each other. For example, each of the base codebook and the concatenation codebook may be fed back with an almost fixed period, a relatively long-term based period, or a relatively short-tem based period, such that the resultant codebook may be configured.

The above equation 6 may also be represented by the following equation 8.

$$V_i = \Phi_k \times V_i$$
[Equation 8]

In Equation 8,
$\Phi_k$
is a DFT-based codebook, and
$V_i$
is a predefined codebook (i.e., the 802.16 codebook). These codebooks may be considered to be examples of the concatenation codebook $A_{Nt \times Nt}$ and the base codebook $B_{Nt \times Nr}$ shown in Equation 6. Also,
$\Phi_k$
may use a codebook which has been fed back using a long-term based period longer than that of
$V_i$ The same method may also be applied to a precoder/beamformer transferred according to individual codebooks shown in the above equations 5 and 6. In this case, the mobile station of the neighbor base station may request the control of interference using the following methods.

In a first method, the mobile station may generate a request for prohibiting the use of the transferred precoder/beamformer, i.e., prohibiting the use of a specific element of a codebook set $C_{Nt \times Nr}$, or may generate a request for using a specific element of the codebook set $C_{Nt \times Nr}$. According to this first method, codebook elements actually causing the influence may be controlled by the interfering cell. It is obvious to those skilled in the art that methods shown in the embodiments of the present invention can be equally applied to the first method.

In a second method, the mobile station may generate a request for prohibiting the use of a base-codebook element, i.e., prohibiting the use of a specific element of a codebook set $B_{Nt \times Nr}$, or may generate another request for using a specific element of the a codebook set $B_{Nt \times Nr}$.

In another embodiment of the present invention, the above second method may be used. In case of comparing the above first method with the above second method, $B_{Nt \times Nr}$ has a total of m elements whereas $C_{Nt \times Nr}$ has a total of n elements (where n=m×l). Therefore, the mobile station of the neighbor cell receiving the interference may designate an element, the use of which will be restricted, or another element, the use of which will be requested, and feeds back the designated elements to the interfering cell, an amount of overhead generated in the second method is smaller than that of the first method. That is, since the relationship of m<l is satisfied, the number of bits used for the feedback of the second method may be lower than that of the first method. The transferred precoder/beamformer has been made on the basis of elements of the base codebook. So, if the elements of the base codebook are restricted, C (i.e., AB or BA) formed of the above elements may also be controlled. In case of using the above-mentioned method, although $C^i_{Nt \times Nr}$ actually causing the influence (where i=0, 1, 2, . . . , n−1) (i.e., elements of the codebook set $C_{Nt \times Nr}$) is not controlled, the number of calculations of the mobile station and an amount of feedback overhead of the mobile station can be effectively reduced.

In this embodiment, the base station of the interfering cell and the mobile station receiving the interference may have a base codebook and a concatenation codebook, respectively. In this case, the mobile station may decide elements of the base-codebook set the use of which should be restricted, or may decide elements of the base-codebook set the use of which should be requested, such that it can remove the interference caused by the neighbor cell using the above-mentioned elements. The base station may use or disuse elements of a specific codebook set using the transferred base-codebook elements.

For example, if the mobile station decides base-codebook's elements the use of which should be restricted in the base station of the interfering cell, and then transmits the measured elements, the base station of the interfering cell may calculate optimum codebook elements using the base codebook except for the transferred base-codebook's elements. That is, if the mobile station measures one element (e.g., $B^0_{Nt \times Nr}$) of the base codebook, the use of which should be restricted in the base station of the interfering cell, and then transmits the measured element, the interfering cell may calculate an optimum codebook element using the set except for $B^0_{Nt \times Nr}$ in $B_{Nt \times Nr}$ of Equation 5. Here, one or more elements may be transferred.

On the contrary, if the base-codebook elements, the use of which will be requested, are transferred from the mobile station to the base station, the base station of the interfering cell may calculate optimum codebook elements to be used, using the transferred base-codebook elements and the concatenation-codebook set. In other words, if one element $B^0_{Nt \times Nr}$ of the base codebook, which must be used in the base station of interfering cell, is measured and transferred, the interfering cell can calculate an optimum codebook element using $B^0_{Nt \times Nr}$ of $B_{Nt \times Nr}$ of Equation 5 and the concatenation codebook $A_{Nt \times Nt}$. In this case, one or more elements may be transferred.

The method of FIG. 4 may be modified, so that the modified method may be applied to the above-mentioned embodiments. In more detail, the mobile station measures the base-codebook element of the interfering cell giving the mobile station itself the influence at intervals of a predetermined time, and transmits the measured element. Also, the interfering cell may apply a predetermined method to the transferred base-codebook element at intervals of a predetermined time.

Also, the method of FIG. 5 may be modified so that the modified method may also be applied to the above-mentioned embodiments. That is, base-codebook elements of the interfering cell giving the mobile station the influence may be transferred over a feedback channel related to the interfering cell, or may also be transferred over a backbone network.

In addition, it is obvious to those skilled in the art that the methods of FIGS. 6 to 11 may be modified so that the modified methods may be applied to the above-mentioned embodiments.

The above embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics.

Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope and spirit of the present invention.

The embodiments of the present invention have been disclosed on the basis of a data communication relationship between the base station and the mobile station (or the user equipment (UE)). In this case, the base station is used as a terminal node of a network via which the Node-B can directly communicate with the mobile station. Specific operations to be conducted by the eNode-B in the present invention may also be conducted by an upper node as necessary. In other words, it will be obvious to those skilled in the art that various operations for enabling the eNode-B to communicate with the user equipment (UE) in a network composed of several network nodes including the base stations will be conducted by the base station or other network nodes other than the base station. The term "base station (BS)" may be replaced with a fixed station, Node-B, eNode-B (eNB), or an access point as necessary. The term "mobile station (MS)" may be replaced with a user equipment (UE), a mobile station (MS), or a mobile subscriber station (MSS) as necessary.

The above-mentioned embodiments of the present invention can be implemented by hardware, firmware, software, or a combination of them. In the case of implementing the present invention by hardware, one embodiment of the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor. If operations or functions of the present invention are implemented by firmware or software, the present invention can be implemented in the form of a variety of formats, for example, modules, procedures, and functions, etc. The software codes may be stored in a memory unit so that it can be driven by a processor. The memory unit is located inside or outside of the processor, so that it can communicate with the aforementioned processor via a variety of well-known parts. It will be apparent to those skilled in the art that various modifications and variations can be made in the present invention without departing from the spirit or scope of the invention. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

As apparent from the above description, a performance or throughput of an edge-located mobile station employing a closed-loop MIMO system in a multi-cell environment is greatly decreased. In order to reduce the interfering-cell's interference on the edge-located mobile station and the inter-cell interference (ICI) influence on the same edge-located mobile station, a base station of a cell causing the interference (i.e., an interfering cell) restricts a use of a precoding vector affecting other cells and uses a sub-optimal codebook vector, such that it can improve a performance or throughput of the edge-located mobile station and the whole cell. Also, the present invention may quantitatively use a PMI table made for restricting the use of the codebook vector of the interfering cell or may transmit the made table to an upper layer and use the table for a long period of time, such that it can reduce an amount of overhead. In addition, the present invention need not perform additional complicated calculations for removing the ICI, resulting in the implementation of a low complexity.

In conclusion, when a mobile station based on a closed-loop MIMO system in a multi-cell environment is located at a cell edge so that it unavoidably receives the interference from the neighbor cell, the present invention provides a method for reducing an inter-cell interference (ICI) such that a high-quality service can be provided to the mobile station located at the cell edge.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Industrial Applicability

The present invention can be used for a telecommunication device for a wireless mobile cellular communication system.

The invention claimed is:

1. A method for reducing an inter-cell interference (ICI) by a mobile station in a multi-cell environment, the method comprising:
   selecting one or more rank-1 PMIs which act as the strongest or weakest interference for at least one neighboring base station from a rank-1 base codebook; and
   transmitting the one or more rank-1 PMIs to a serving base station,
   wherein the one or more rank-1 PMIs are transferred from the serving base station to the at least one neighboring base station,
   wherein a precoding matrix for is determined based on the one or more rank-1 PMIs by the at least one neighboring base station,
   wherein the one or more rank-1 PMIs which act as the strongest interference are used for restricting the one or more rank-1 PMIs in the rank-1 base codebook, when the precoding matrix is determined by the at least one neighboring base station,
   wherein the one or more rank-1 PMIs which act as the weakest interference are used for recommending the one or more rank-1 PMIs in the rank-1 base codebook, when the precoding matrix is determined by the at least one neighboring base station.

2. A method for reducing an inter-cell interference (ICI) by a specific base station in a multi-cell environment, the method comprising:
   receiving, in relation to at least one neighbor base station, one or more rank-1 PMIs which act as the strongest or weakest interference for the at least one neighboring base station from the mobile station;
   transferring the one or more rank-1 PMIs to the at least one neighbor base station; and
   wherein a precoding matrix is determined based on the one or more rank-1 PMIs by the at least one neighboring base station,
   wherein the one or more rank-1 PMIs are selected from a rank-1 base codebook by the mobile station,
   wherein the one or more rank-1 PMIs which act as the strongest interference are used for restricting the one or more rank-1 PMIs in the rank-1 base codebook, when the precoding matrix is determined by the at least one neighboring base station,
   wherein the one or more rank-1 PMIs which act as the weakest interference are used for recommending the one or more rank-1 PMIs in the rank-1 base codebook, when the precoding matrix is determined by the at least one neighboring base station.

3. The method according to claim 1, wherein the at least one neighboring base station determines the precoding matrix by using the one or more rank-1 PMIs and a concatenated codebook.

4. The method according to claim 3, wherein a feedback period of the rank-1 base codebook is shorter than that of the concatenated codebook.

5. The method according to claim 2, wherein the precoding matrix is determined by using the one or more rank-1 PMIs and a concatenated codebook by the at least one neighboring base station.

6. The method according to claim 5, wherein a feedback period of the rank-1 base codebook is shorter than that of the concatenated codebook.

* * * * *